United States Patent
Brousmiche et al.

(10) Patent No.: US 11,376,561 B2
(45) Date of Patent: Jul. 5, 2022

(54) SORBENT PARTICLES FOR SAMPLE TREATMENT

(71) Applicant: Waters Technologies Corporation, Milford, MA (US)

(72) Inventors: Darryl W. Brousmiche, Grafton, MA (US); Kevin D. Wyndham, Upton, MA (US); Nicole L. Lawrence, Stafford Springs, CT (US); Jacob N. Fairchild, Upton, MA (US); Bonnie A. Alden, Whitinsville, MA (US)

(73) Assignee: Waters Technologies Corporation, Milford, MA (US)

( * ) Notice: Subject to any disclaimer, the term of this patent is extended or adjusted under 35 U.S.C. 154(b) by 304 days.

(21) Appl. No.: 16/591,302

(22) Filed: Oct. 2, 2019

(65) Prior Publication Data

US 2020/0101437 A1    Apr. 2, 2020

Related U.S. Application Data

(60) Provisional application No. 62/740,279, filed on Oct. 2, 2018.

(51) Int. Cl.
| | | |
|---|---|---|
| *B01J 20/10* | (2006.01) | |
| *B01J 20/22* | (2006.01) | |
| *B01J 20/26* | (2006.01) | |
| *B01J 20/32* | (2006.01) | |

(52) U.S. Cl.
CPC .......... *B01J 20/103* (2013.01); *B01J 20/223* (2013.01); *B01J 20/264* (2013.01); *B01J 20/3204* (2013.01); *B01J 20/3276* (2013.01)

(58) Field of Classification Search
CPC ........ B01J 20/10; B01J 20/103; B01J 20/223; B01J 20/264; B01J 20/3204; B01J 20/3276
USPC ....................................................... 423/400
See application file for complete search history.

(56) References Cited

U.S. PATENT DOCUMENTS

| | | | |
|---|---|---|---|
| 6,326,326 B1* | 12/2001 | Feng | .................... B01J 20/0211 423/701 |
| 6,686,035 B2 | 2/2004 | Jiang et al. | |
| 7,223,473 B2 | 5/2007 | Jiang et al. | |
| 7,442,299 B2 | 10/2008 | Lee et al. | |
| 7,919,177 B2 | 4/2011 | Jiang et al. | |
| 8,791,220 B2 | 7/2014 | Jiang et al. | |
| 9,211,524 B2 | 12/2015 | Jiang et al. | |
| 2008/0154029 A1* | 6/2008 | Balayan | ................. B01J 20/265 536/25.4 |
| 2012/0055860 A1 | 3/2012 | Wyndham et al. | |
| 2014/0096596 A1 | 4/2014 | Brousmiche et al. | |
| 2014/0194283 A1 | 7/2014 | Jiang et al. | |

FOREIGN PATENT DOCUMENTS

| | | |
|---|---|---|
| WO | 2008103423 A1 | 8/2008 |
| WO | 2016100447 A1 | 6/2016 |

OTHER PUBLICATIONS

Laschewsky, A., "Structures and Synthesis of Zwitterionic Polymers" Polymers 6(5):1544-1601 (2014).
Ismaiel, O. A., et al., "investigation of endogenous blood plasma phospholipids, cholesterol and glycerides that contribute to matrix effects in bioanalysis by liquid chromatography/mass spectrometry", J Chromatogr. B. 878:3303-3316 (2010).
International Search Report and Written Opinion for International application No. PCT/US2019/054327, dated Feb. 25, 2020, 9 pages.
Author unknown, "Waters Oasis Sample Extraction SPE Products: Waters", waters [online] 2017 [retrieved May 21, 2020]. Retrieved from Internet URL:https://web.archive.org/web/20171106163314/http://www.waters.com:80/waters/enUS/Waters-Oasis-Sample-Extraction-SPE-Products/nav.htm?cid=513209&locale=enUS, 5 pages.

* cited by examiner

*Primary Examiner* — Edward M Johnson
(74) *Attorney, Agent, or Firm* — Womble Bond Dickinson (US) LLP; Deborah M. Vernon

(57) ABSTRACT

Sorbents, devices, kits and methods useful for sample treatment are disclosed herein. In particular embodiments, described are inorganic/organic hybrid sorbent particles comprising (a) a core region that comprises a silica component and (b) a surface region that comprises an organic copolymer comprising at least one hydrophobic organic monomer and at least one hydrophilic organic monomer.

34 Claims, 4 Drawing Sheets

| Sample ID | Monomer 1 | | Monomer 2 | | Monomer 3 | | % C | % N | 50% v (μm) | 90/10 | SA (m²/g) | PV (cc/g) | PD (Å) |
|---|---|---|---|---|---|---|---|---|---|---|---|---|---|
| | Name | Moles | Name | Moles | Name | Moles | | | | | | | |
| 1a | DVB | 1.34 | N-VP | 0.70 | MAPTMOS | 0.16 | 79.86 | 1.61 | -- | -- | 622 | 0.81 | 64 |
| 1b | DVB | 1.34 | N-VP | 0.93 | MAPTMOS | 0.31 | 77.30 | 0.91 | -- | -- | 394 | 0.32 | 35 |
| 1c | DVB | 1.35 | N-VP | 0.93 | MAPTMOS | 0.13 | 80.00 | 2.10 | -- | -- | 642 | 0.81 | 60 |
| 1d | DVB | 1.34 | N-VP | 0.70 | MAPTMOS | 0.16 | 80.96 | 1.64 | 40.9 | 2.6 | 644 | 0.89 | 68 |
| 1e | DVB | 1.34 | N-VP | 0.58 | MAPTMOS | 0.16 | 81.30 | 1.42 | 38.0 | 2.9 | 669 | 0.89 | 64 |
| 1f | DVB | 1.34 | V-CAP | 0.49 | MAPTMOS | 0.16 | 81.24 | 1.46 | 47.4 | 2.7 | 649 | 0.91 | 70 |
| 1g | DVB | 1.34 | N-VP | 0.70 | Styryl TMOS | 0.16 | 82.90 | 1.57 | 49.1 | 2.6 | 719 | 0.89 | 61 |
| 1h | DVB | 1.07 | N-VP | 0.63 | Styryl TMOS | 0.19 | 81.19 | 1.62 | 43.3 | 2.8 | 676 | 0.81 | 57 |
| 1i | DVB | 1.07 | V-CAP | 0.32 | Styryl TMOS | 0.19 | 81.15 | 1.28 | 56.7 | 2.6 | 679 | 0.89 | 65 |

FIG. 5

| Sulfonation Sample ID | Precursor Sample ID | Monomer 1 | | Monomer 2 | | Monomer 3 | | % C | %N | 50% v (µm) | 90/10 | SA (m²/g) | PV (cc/g) | PD (Å) |
|---|---|---|---|---|---|---|---|---|---|---|---|---|---|---|
| | | Name | Moles | Name | Moles | Name | Moles | | | | | | | |
| 2a | 1a | DVB | 1.34 | N-VP | 0.70 | MAPT MOS | 0.16 | 73.7 | -- | -- | -- | 650 | 0.77 | 64 |
| 2b | 1b | DVB | 1.34 | N-VP | 0.93 | MAPT MOS | 0.31 | 71.4 | -- | -- | -- | 540 | 0.39 | 36 |
| 2c | 1c | DVB | 1.35 | N-VP | 0.93 | MAPT MOS | 0.13 | 74.7 | -- | -- | -- | 653 | 0.80 | 63 |
| 2d | 1d | DVB | 1.34 | N-VP | 0.70 | MAPT MOS | 0.16 | 73.9 | 1.55 | 46.5 | 1.81 | 686 | 0.87 | 69 |
| 2e | 1e | DVB | 1.34 | N-VP | 0.58 | MAPT MOS | 0.16 | 73.7 | 1.33 | 47.4 | 1.79 | 717 | 0.86 | 65 |
| 2f | 1f | DVB | 1.34 | V-CAP | 0.49 | MAPT MOS | 0.16 | 74.7 | 1.37 | 57.2 | 1.63 | 702 | 0.91 | 71 |
| 2g | 1g | DVB | 1.34 | N-VP | 0.70 | Styryl TMOS | 0.16 | 74.5 | 1.43 | 58.7 | 1.72 | 713 | 0.81 | 61 |
| 2h | 1h | DVB | 1.07 | N-VP | 0.63 | Styryl TMOS | 0.19 | 73.3 | 1.52 | 58.1 | 1.67 | 682 | 0.71 | 54 |
| 2i | 1i | DVB | 1.07 | V-CAP | 0.32 | Styryl TMOS | 0.19 | 73.4 | 1.16 | 65.0 | 1.74 | 694 | 0.82 | 66 |

FIG. 6

SORBENT PARTICLES FOR SAMPLE TREATMENT

STATEMENT OF RELATED APPLICATION

This application claims the benefit of U.S. Provisional Application Ser. No. 62/740,279, filed Oct. 2, 2018 and entitled "SORBENTS, DEVICES, KITS AND METHODS USEFUL FOR BIOLOGICAL SAMPLE TREATMENT", which is hereby incorporated by reference.

FIELD

The present disclosure relates to sorbents, devices, kits and methods that may be used, for example, for the treatment of a biological sample of interest. More particularly, the present disclosure relates to sorbents, devices, kits and methods that may be used for removal of matrix molecules, including phospholipids, from a biological sample of interest by Solid Phase Extraction (SPE).

BACKGROUND

Biological samples (e.g., biological fluids, animal tissue, plant tissue, food, etc.) contain matrix components (i.e., components of a sample other than the analyte of interest), many of which can interfere with sample analyses, including liquid chromatography-mass spectrometry (LC-MS) analysis. For example, biological samples, such as biological fluids, including plasma, whole blood, oral fluids, and urine, among others, animal tissue, plant tissue, and certain foods can contain lipids, cells (proteins, peptides, amino acids, cell structures and organelles) and salts which can interfere with LC-MS separations and detection. The interference often manifests itself as shifting retention times, convoluted detector signal (co-elution and noisy baseline), signal suppression (ion suppression) and MS adducts (i.e. Na+ or Cl-adducts). Lipids, including phospholipids, can also lead to column and instrument fouling during LC-MS analysis. Removing such matrix components can be advantageous to improve signal to noise ratios and data reproducibility. Matrix removal devices can also be used to enrich analytes of very low concentration or to add specificity to a given analytical protocol (i.e. extraction).

SUMMARY

In various aspects, the present disclosure pertains to methods of sample treatment that comprise: adding a sample fluid comprising a sample that comprises at least one target analyte to a sorbent that comprises a silica component, a C4-C60 alkyl component, and an organic copolymer component comprising at least one hydrophobic organic monomer and at least one hydrophilic organic monomer, thereby resulting in sorbent with bound target analyte; and adding an elution solution that comprises a protic solvent and a polar aprotic solvent to the sorbent, thereby desorbing the target analyte from the sorbent and forming a solution of the target analyte in the elution fluid.

In various aspects, the present disclosure pertains to kits that comprise a sorbent that comprises a silica component, a C4-C60 alkyl component, and an organic copolymer component comprising a hydrophobic organic monomer and a hydrophilic organic monomer and one or more kit components selected from (a) an elution solution that comprises a protic solvent and a polar aprotic solvent (b) a pretreatment solution, (c) one or more washing solutions, (d) a collection plate or barrel, (e) a cap mat, (f) calibration and reference standards, and (g) Identification tagging for each component.

In various aspects, the present disclosure pertains to inorganic/organic hybrid sorbent particles that comprise (a) a core region that comprises an organic copolymer comprising at least one hydrophobic organic monomer and at least one hydrophilic organic monomer and (b) a surface region that comprises a silica component.

In various aspects, the present disclosure pertains to inorganic/organic hybrid sorbent particles that comprise (a) a core region that comprises a silica component and (b) a surface region that comprises an organic copolymer comprising at least one hydrophobic organic monomer and at least one hydrophilic organic monomer.

In various aspects, the present disclosure pertains to inorganic/organic hybrid sorbent particles that comprise an organic copolymer that comprises at least one hydrophilic organic monomer, at least one hydrophobic organic monomer, and at least one alkenyl-functionalized organosilane monomer, wherein the particles are modified by the addition of a C4-C60 alkyl component.

Additional aspects and embodiments of the present disclosure are set forth in the following enumerated paragraphs:

Aspect A1. Inorganic/organic hybrid sorbent particles comprising (a) a core region that comprises a silica component and (b) a surface region that comprises an organic copolymer comprising at least one hydrophobic organic monomer and at least one hydrophilic organic monomer.

Aspect A2. The inorganic/organic hybrid sorbent particles of aspect A1, herein the core region consists of silica or comprises a material having the formula $SiO_2/(R^2_p R^4_q SiO_t)_n$ or $SiO_2/[R^6(R^2_r SiO_t)_m]_n$ wherein $R^2$ and $R^4$ are independently $C_1$-$C_{18}$ aliphatic or aromatic moieties, $R^6$ is a substituted or unsubstituted $C_1$-$C_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.

Aspect A3. The inorganic/organic hybrid sorbent particles of any of aspects A1-A2, further comprising a C4-C60 alkyl component.

Aspect A4. The inorganic/organic hybrid sorbent particles of any of aspects A1-3, wherein the core region is formed by hydrolytically condensing one or more silane compounds.

Aspect A5. The inorganic/organic hybrid sorbent particles of aspect A4, wherein the one or more silane compounds that are hydrolytically condensed comprise (a) one or more silane compounds of the formula $SiZ_1Z_2Z_3Z_4$, where $Z_1$, $Z_2$, $Z_3$ and $Z_4$ are independently selected from Cl, Br, I, C1-C4 alkoxy, C1-C4 alkylamino, and C1-C4 alkyl, although at most three of $Z_1$, $Z_2$, $Z_3$ and $Z_4$ can be C1-C4 alkyl and/or (b) one or more compounds of the formula $Si\ Z_1Z_2Z_3$—R—$SiZ_4Z_5Z_6$, where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl, and where $Z_4$, $Z_5$ and $Z_6$ are independently selected from Cl, Br, I, C1-C4 alkoxy, C1-C4 alkylamino, and C1-C4 alkyl, although at most two of $Z_4$, $Z_5$ and $Z_6$ can be C1-C4 alkyl.

Aspect A6. The inorganic/organic hybrid sorbent particles of aspect A4, wherein the one or more alkoxysilane compounds are selected from tetraalkoxysilanes, bis(trialkoxysilyl)alkanes, and alkyl-trialkoxysilane.

Aspect A7. The inorganic/organic hybrid sorbent particles of any of aspects A4-A6, wherein the one or more silane compounds that are hydrolytically condensed further comprise a C4-C60-alkyl-functionalized organosilane compound.

Aspect A8. The inorganic/organic hybrid sorbent particles of any of aspects A1-A6, wherein a previously formed core region is reacted with a C4-C60-alkyl-functionalized organosilane compound.

Aspect A9. The inorganic/organic hybrid sorbent particles of any of aspects A7-A8, wherein the C4-C60-alkyl-functionalized organosilane compound is a compound of the formula $RSiZ_1Z_2Z_3$, where R is C4-C60 alkyl and where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl.

Aspect A10. The inorganic/organic hybrid sorbent particles of any of aspects A7-A8, wherein the C4-C60-alkyl-organosilane is selected from octadecyltrimethoxysilane, octadecyltriethoxysilane, octadecyltrichlorosilane, octadecyltri(dimethylamino)silane, methyloctadecyldimethoxysilane, methyloctadecyldiethoxysilane, methyloctadecyldichlorosilane, methyloctadecyldi(dimethylamino)silane, dimethyloctadecylmethoxysilane, dimethyloctadecylethoxysilane, dimethyloctadecylchlorosilane, dimethyloctadecyldimethylaminosilane, diisopropyloctadecylmethoxysilane, diisopropyloctadecylethoxysilane, diisopropyloctadecylchlorosilane, diisopropyloctadecyldimethylaminosilane, octyltrimethoxysilane, octyltriethoxysilane, octyltrichlorosilane, octyltri(dimethylamino)silane, methyloctyldimethoxysilane, methyloctyldiethoxysilane, methyloctyldichlorosilane, methyloctyldi(dimethylamino)silane, dimethyloctylmethoxysilane, dimethyloctylethoxysilane, dimethyloctylchlorosilane, dimethyloctyldimethylaminosilane, diisopropyloctylmethoxysilane, diisopropyloctylethoxysilane, diisopropyloctylchlorosilane, diisopropyloctyldimethylaminosilane, butyltrimethoxysilane, butyltriethoxysilane, butyltrichlorosilane, butyltri(dimethylamino)silane, methylbutyldimethoxysilane, methylbutyldiethoxysilane, methylbutyldichlorosilane, methylbutyldi(dimethylamino)silane, dimethylbutylmethoxysilane, dimethylbutylethoxysilane, dimethylbutylchlorosilane, dimethylbutyldimethylaminosilane, diisopropylbutylmethoxysilane, diisopropylbutylethoxysilane, diisopropylbutylchlorosilane, and diisopropylbutyldimethylaminosilane.

Aspect A11. The inorganic/organic hybrid sorbent particles of any of aspects A1-A10, wherein the core region further comprises an alkenyl-functionalized organosilane species incorporated into the core.

Aspect A12. The inorganic/organic hybrid sorbent particles of any of aspects A1-A10, wherein an alkenyl-functionalized organosilane monomer is attached at the surface of the core region, Aspect A13. The inorganic/organic hybrid sorbent particles of any of aspects A3-A10, wherein the silane compounds that are hydrolytically condensed further comprise an alkenyl-functionalized organosilane species.

Aspect A14. The inorganic/organic hybrid sorbent particles of any of aspects A11-A13, wherein the alkenyl-functionalized organosilane monomer is selected from 3-(trimethoxysilyl)propyl methacrylate (MAPTMOS), and vinyltriethoxysilane (VTES).

Aspect A15. The inorganic/organic hybrid sorbent particles of any of aspects A1-A14, wherein the surface region that comprises the organic copolymer is formed by a process that comprises an addition polymerization of the at least one hydrophobic organic monomer and the at least one hydrophilic organic monomer.

Aspect A16. The inorganic/organic hybrid sorbent particles of any of aspects A1-A14, wherein the surface region that comprises the organic copolymer is formed by a process that comprises free radical polymerization of the at least one hydrophobic organic monomer and the at least one hydrophilic organic monomer.

Aspect A17. The inorganic/organic hybrid sorbent particles of aspect A16, wherein the living radical polymerization is selected from Reversible Addition-Fragmentation Chain Transfer Polymerization (RAFT) and Atom Transfer Radical Polymerization (ATRP).

Aspect A18. The inorganic/organic hybrid sorbent particles of any of aspects A1-A17, wherein the surface region that comprises the organic copolymer is formed by a process that comprises forming the organic copolymer and grafting the organic copolymer onto a surface of the core region (i.e., "grafting to") or polymerizing the organic copolymer from initiator sites on the surface of the core region ("grafting from").

Aspect A19. The inorganic/organic hybrid sorbent particles of any of aspects A1-A18, wherein the hydrophilic organic monomer comprises a monomer having the following formula,

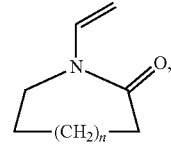

where n ranges from 1-3.

Aspect A20. The inorganic/organic hybrid sorbent particles of any of aspects A1-A19, wherein the hydrophobic organic monomer comprises divinylbenzene and, optionally, styrene.

Aspect A21. The inorganic/organic hybrid sorbent particles of any of aspects A1-A20, wherein the organic copolymer further comprises an organic monomer that comprises one or more sulfonate groups.

Aspect A22. The inorganic/organic hybrid sorbent particles of any of aspects A1-A20, wherein the organic copolymer further comprises a divinylbenzene monomer that comprises one or more sulfonate groups.

Aspect A23. The inorganic/organic hybrid sorbent particles of any of aspects A1-A20, wherein the organic copolymer further comprises an organic monomer that comprises one or more quaternary ammonium groups.

Aspect A24. The inorganic/organic hybrid sorbent particles of any of aspects A1-A20, wherein the organic copolymer further comprises an organic monomer that comprises one or more $—R_1N^+R_2R_3R_4$ groups, where $R_1$ is a C1-C8 alkylene group, and $R_2$, $R_3$ and $R_4$ are C1-C8 alkyl groups and may be the same or different.

Aspect A25. The inorganic/organic hybrid sorbent particles of any of aspects A1-A20, wherein the organic copolymer further comprises a divinylbenzene monomer that comprises one or more $—R_1N^+R_2R_3R_4$ groups, where $R_1$ is a C1-C8 alkylene group, and $R_2$, $R_3$ and $R_4$ are C1-C8 alkyl groups and may be the same or different.

Aspect A26. The inorganic/organic hybrid sorbent particles of any of aspects A24-A25, wherein w=1, x=0, y=0 and z=3.

Aspect A27. The inorganic/organic hybrid sorbent particles of any of aspects A1-A20, wherein the organic copolymer further comprises an organic monomer that comprises one or more carboxyl groups.

Aspect A28. The inorganic/organic hybrid sorbent particles of any of aspects A1-A20, wherein the organic copolymer further comprises a divinylbenzene monomer that comprises one or more carboxyl groups.

Aspect A29. The inorganic/organic hybrid sorbent particles of any of aspects A1-A20, wherein the organic copolymer further comprises an organic monomer that comprises one or more primary, secondary or tertiary amine groups.

Aspect 30. The inorganic/organic hybrid sorbent particles of any of aspects A1-A20, wherein the organic copolymer further comprises a divinylbenzene monomer that comprises one or more piperazine groups.

Aspect A31. The inorganic/organic hybrid sorbent particles of any of aspects A1-A30, wherein the organic copolymer further comprises one or more C4-C60 alkyl groups.

Aspect A32. The inorganic/organic hybrid sorbent particles of any of aspects A1-A30, wherein the organic copolymer further includes a C4-C-60-alkyl functionalized unsaturated monomer.

Aspect A33. The inorganic/organic hybrid sorbent particles of any of aspects A1-A30, wherein a C4-C-60-alkyl-group is attached to the organic copolymer.

Aspect A34. The inorganic/organic hybrid sorbent particles of any of aspects A1-A20, wherein the organic copolymer further comprises a divinylbenzene monomer that comprises one or more piperazine groups.

Aspect A35. The inorganic/organic hybrid sorbent particles of any of aspects A1-A30, wherein the organic copolymer further comprises one or more C4-C60 alkyl groups.

Aspect A36. The inorganic/organic hybrid sorbent particles of any of aspects A1-A30, wherein the organic copolymer further includes a C4-C-60-alkyl functionalized unsaturated monomer.

Aspect A37. The inorganic/organic hybrid sorbent particles of any of aspects A1-A30, wherein a C4-C-60-alkyl-group is attached to the organic copolymer.

Aspect B1. Inorganic/organic hybrid sorbent particles comprising (a) a core region that comprises an organic copolymer comprising at least one hydrophobic organic monomer and at least one hydrophilic organic monomer and (b) a surface region that comprises a silica component.

Aspect B2. The inorganic/organic hybrid sorbent particles of aspect B 1, wherein the surface region further comprises a C4-C60 alkyl component.

The inorganic/organic hybrid sorbent particles of aspect B 1, wherein the at least one hydrophilic organic monomer comprises a monomer having the following formula,

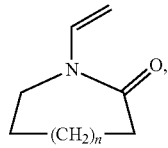

where n ranges from 1-3

Aspect B4. The inorganic/organic hybrid sorbent particles of any of aspects B1-B3, wherein the at least one hydrophobic organic monomer comprises divinylbenzene and, optionally, styrene.

Aspect B5. The inorganic/organic hybrid sorbent particles of any of aspects B1-B4, wherein the organic copolymer further comprises an organic monomer that comprises one or more sulfonate groups.

Aspect B6. The inorganic/organic hybrid sorbent particles of any of aspects B 1-B4, wherein the organic copolymer further comprises a divinylbenzene monomer that comprises one or more sulfonate groups.

Aspect B7. The inorganic/organic hybrid sorbent particles of any of aspects B 1-B4, wherein the organic copolymer further comprises an organic monomer that comprises one or more quaternary ammonium groups.

Aspect B8. The inorganic/organic hybrid sorbent particles of any of aspects B1-B4, wherein the organic copolymer further comprises an organic monomer that comprises one or more —$R_1$—$N^+R_2R_3R_4$ groups, where $R_1$ is a C1-C8 alkylene group, and $R_2$, $R_3$ and $R_4$ are C1-C8 alkyl groups and may be the same or different.

Aspect B9. The inorganic/organic hybrid sorbent particles of any of aspects B1-B4, wherein the organic copolymer further comprises a divinylbenzene monomer that comprises one or more —$R_1$—$N^+R_2R_3R_4$ groups, where $R_1$ is a C1-C8 alkylene group, and $R_2$, $R_3$ and $R_4$ are C1-C8 alkyl groups and may be the same or different.

Aspect B10. The inorganic/organic hybrid sorbent particles of any of aspects B8-B9, wherein $R_1$ is C1 alkyl, $R_2$ is C1 alkyl, $R_3$ is C1 alkyl, and $R_4$ is C4 alkyl.

Aspect B11. The inorganic/organic hybrid sorbent particles of any of aspects B 1-B4, wherein the organic copolymer further comprises an organic monomer that comprises one or more carboxyl groups.

Aspect B12. The inorganic/organic hybrid sorbent particles of any of aspects B1-B4, wherein the organic copolymer further comprises a divinylbenzene monomer that comprises one or more carboxyl groups.

Aspect B13. The inorganic/organic hybrid sorbent particles of any of aspects B 1-B4, wherein the organic copolymer further comprises an organic monomer that comprises one or more primary, secondary or tertiary amine groups.

Aspect B14. The inorganic/organic hybrid sorbent particles of any of aspects B1-B4, wherein the organic copolymer further comprises a divinylbenzene monomer that comprises one or more piperazine groups.

Aspect B15. The inorganic/organic hybrid sorbent particles of any of aspects B1-B14, wherein the surface region is formed by hydrolytically condensing one or more silane compounds at the surface region of the core region.

Aspect B16. The inorganic/organic hybrid sorbent particles of aspect B15, wherein the one or more silane compounds that are hydrolytically condensed comprise (a) one or more silane compounds of the formula $SiZ_1Z_2Z_3Z_4$, where $Z_1$, $Z_2$, $Z_3$ and $Z_4$ are independently selected from Cl, Br, I, C1-C4 alkoxy, C1-C4 alkylamino, and C1-C4 alkyl, although at most three of $Z_1$, $Z_2$, $Z_3$ and $Z_4$ can be C1-C4 alkyl and/or (b) one or more compounds of the formula $Si Z_1Z_2Z_3$—R—$SiZ_4Z_5Z_6$, where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl, and where $Z_4$, $Z_5$ and $Z_6$ are independently selected from Cl, Br, I, C1-C4 alkoxy, C1-C4 alkylamino, and C1-C4 alkyl, although at most two of $Z_4$, $Z_5$ and $Z_6$ can be C1-C4 alkyl.

Aspect B17. The inorganic/organic hybrid sorbent particles of aspect B15, wherein the one or more silane compounds that are hydrolytically condensed are selected from tetraalkoxysilanes, bis(trialkoxysilyl)alkanes and alkyl-trialkoxysilanes.

Aspect B18. The inorganic/organic hybrid sorbent particles of aspect B15, wherein the one or more silane compounds that are hydrolytically condensed are selected from tetramethoxysilane, tetraethoxysilane, bis(triethoxysilyl)ethane and methyl-triethoxysilane.

Aspect B19. The inorganic/organic hybrid sorbent particles of any of aspects B15-B18, wherein the one or more silane compounds that are hydrolytically condensed further comprise a C4-C60-alkyl-functionalized organosilane compound.

Aspect B20. The inorganic/organic hybrid sorbent particles of any of aspects B15-B18, wherein the surface region is formed by hydrolytically condensing one or more silane compounds at the surface region of the core region, followed by reaction with a C4-C60-alkyl-functionalized organosilane compound.

Aspect B21. The inorganic/organic hybrid sorbent particles of any of aspects B19-B20, wherein the C4-C60-alkyl-functionalized organosilane compound is a compound of the formula $RSiZ_1Z_2Z_3$, where R is C4-C60 alkyl and where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl.

Aspect B22. The inorganic/organic hybrid sorbent particles of any of aspects B19-B20, wherein the C4-C60-alkylorganosilane is selected from octadecyltrimethoxysilane, octadecyltriethoxysilane, octadecyltrichlorosilane, octadecyltri(dimethylamino)silane, methyloctadecyldimethoxysilane, methyloctadecyldiethoxysilane, methyloctadecyldichlorosilane, methyloctadecyldi(dimethylamino)silane, dimethyloctadecylmethoxysilane, dimethyloctadecylethoxysilane, dimethyloctadecylchlorosilane, dimethyloctadecyldimethylaminosilane, diisopropyloctadecylmethoxysilane, diisopropyloctadecylethoxysilane, diisopropyloctadecylchlorosilane, diisopropyloctadecyldimethylaminosilane, octyltrimethoxysilane, octyltriethoxysilane, octyltrichlorosilane, octyltri(dimethylamino)silane, methyloctyldimethoxysilane, methyloctyldiethoxysilane, methyloctyldichlorosilane, methyloctyldi(dimethylamino)silane, dimethyloctylmethoxysilane, dimethyloctylethoxysilane, dimethyloctylchlorosilane, dimethyloctyldimethylaminosilane, diisopropyloctylmethoxysilane, diisopropyloctylethoxysilane, diisopropyloctylchlorosilane, diisopropyloctyldimethylaminosilane, butyltrimethoxysilane, butyltriethoxysilane, butyltrichlorosilane, butyltri(dimethylamino)silane, methylbutyldimethoxysilane, methylbutyldiethoxysilane, methylbutyldichlorosilane, methylbutyldi(dimethylamino)silane, dimethylbutylmethoxysilane, dimethylbutylethoxysilane, dimethylbutylchlorosilane, dimethylbutyldimethylaminosilane, diisopropylbutylmethoxysilane, diisopropylbutylethoxysilane, diisopropylbutylchlorosilane, and diisopropylbutyldimethylaminosilane.

Aspect B23. The inorganic/organic hybrid sorbent particles of any of aspects B19-B20, wherein the one or more silane compounds that are hydrolytically condensed comprise a mixture of octadecyltriethoxysilane, tetraethoxysilane and bis(triethoxysilyl)ethane at a surface region of the core region.

Aspect B24. The inorganic/organic hybrid sorbent particles of any of aspects B1-B23, further comprising an alkenyl-functionalized organosilane monomer.

Aspect B25. The inorganic/organic hybrid sorbent particles of aspect B24, wherein the organic copolymer further comprises the alkenyl-functionalized organosilane monomer.

Aspect B26. The inorganic/organic hybrid sorbent particles of aspect B24, wherein the alkenyl-functionalized organosilane monomer is attached at the surface of the core region, Aspect B27. The inorganic/organic hybrid sorbent particles of any of aspects B24-B26, wherein the alkenyl-functionalized organosilane monomer is selected from 3-(trimethoxysilyl)propyl methacrylate (MAPTMOS), and vinyltriethoxysilane (VTES).

Aspect C1. Inorganic/organic hybrid sorbent particles comprising an organic copolymer that comprises at least one hydrophilic organic monomer, at least one hydrophobic organic monomer, and at least one alkenyl-functionalized organosilane monomer, wherein the particles are modified by the addition of a C4-C60 alkyl component.

Aspect C2. The inorganic/organic hybrid sorbent particles of aspect C1, wherein the particles are modified by hydrolytic condensation of a C4-C60-alkyl-functionalized organosilane compound.

Aspect C3. The inorganic/organic hybrid sorbent particles of aspect C2, wherein the C4-C60-alkyl-functionalized organosilane compound is a compound of the formula $RSiZ_1Z_2Z_3$, where R is C4-C60 alkyl and where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl.

Aspect C4. The inorganic/organic hybrid sorbent particles of aspect C2, wherein the C4-C60-alkylorganosilane is selected from octadecyltrimethoxysilane, octadecyltriethoxysilane, octadecyltrichlorosilane, octadecyltri(dimethylamino)silane, methyloctadecyldimethoxysilane, methyloctadecyldiethoxysilane, methyloctadecyldichlorosilane, methyloctadecyldi(dimethylamino)silane, dimethyloctadecylmethoxysilane, dimethyloctadecylethoxysilane, dimethyloctadecylchlorosilane, dimethyloctadecyldimethylaminosilane, diisopropyloctadecylmethoxysilane, diisopropyloctadecylethoxysilane, diisopropyloctadecylchlorosilane, diisopropyloctadecyldimethylaminosilane, octyltrimethoxysilane, octyltriethoxysilane, octyltrichlorosilane, octyltri(dimethylamino)silane, methyloctyldimethoxysilane, methyloctyldiethoxysilane, methyloctyldichlorosilane, methyloctyldi(dimethylamino)silane, dimethyloctylmethoxysilane, dimethyloctylethoxysilane, dimethyloctylchlorosilane, dimethyloctyldimethylaminosilane, diisopropyloctylmethoxysilane, diisopropyloctylethoxysilane, diisopropyloctylchlorosilane, diisopropyloctyldimethylaminosilane, butyltrimethoxysilane, butyltriethoxysilane, butyltrichlorosilane, butyltri(dimethylamino)silane, methylbutyldimethoxysilane, methylbutyldiethoxysilane, methylbutyldichlorosilane, methylbutyldi(dimethylamino)silane, dimethylbutylmethoxysilane, dimethylbutylethoxysilane, dimethylbutylchlorosilane, dimethylbutyldimethylaminosilane, diisopropylbutylmethoxysilane, diisopropylbutylethoxysilane, diisopropylbutylchlorosilane, and diisopropylbutyldimethylaminosilane.

Aspect C5. The inorganic/organic hybrid sorbent particles of aspect C1, wherein the alkenyl-functionalized organosilane monomer is selected from 3-(trimethoxysilyl)propyl methacrylate (MAPTMOS) and vinyltriethoxysilane (VTES).

Aspect C6. The inorganic/organic hybrid sorbent particles of any of aspects C1-05, wherein the hydrophilic organic monomer comprises a monomer having the following formula,

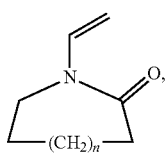

where n ranges from 1-3.

Aspect C7. The inorganic/organic hybrid sorbent particles of any of aspects C1-C6, wherein the hydrophobic organic monomer comprises divinylbenzene and, optionally, styrene.

Aspect C8. The inorganic/organic hybrid sorbent particles of any of aspects C1-C7, wherein the organic copolymer further comprises an organic monomer that comprises one or more sulfonate groups.

Aspect C9. The inorganic/organic hybrid sorbent particles of any of aspects C1-C7, wherein the organic copolymer further comprises a divinylbenzene monomer that comprises one or more sulfonate groups.

Aspect C10. The inorganic/organic hybrid sorbent particles of any of aspects C1-C7, wherein the organic copolymer further comprises an organic monomer that comprises one or more quaternary ammonium groups.

Aspect C11. The inorganic/organic hybrid sorbent particles of any of aspects C1-C7, wherein the organic copolymer further comprises an organic monomer that comprises one or more —$R_1N^+R_2R_3R_4$ groups, where $R_1$ is a C1-C8 alkylene group, and $R_2$, $R_3$ and $R_4$ are C1-C8 alkyl groups and may be the same or different.

Aspect C12. The inorganic/organic hybrid sorbent particles of any of aspects C1-C7, wherein the organic copolymer further comprises a divinylbenzene monomer that comprises one or more —$R_1N^+R_2R_3R_4$ groups, where $R_1$ is a C1-C8 alkylene group, and $R_2$, $R_3$ and $R_4$ are C1-C8 alkyl groups and may be the same or different.

Aspect C13. The inorganic/organic hybrid sorbent particles of any of aspects C11-C12, wherein w=1, x=0, y=0 and z=3.

Aspect C14. The inorganic/organic hybrid sorbent particles of any of aspects C1-C7, wherein the organic copolymer further comprises an organic monomer that comprises one or more carboxyl groups.

Aspect C15. The inorganic/organic hybrid sorbent particles of any of aspects C1-C7, wherein the organic copolymer further comprises a divinylbenzene monomer that comprises one or more carboxyl groups.

Aspect C16. The inorganic/organic hybrid sorbent particles of any of aspects C1-C7, wherein the organic copolymer further comprises an organic monomer that comprises one or more primary, secondary or tertiary amine groups.

Aspect C17. The inorganic/organic hybrid sorbent particles of any of aspects C1C-7, wherein the organic copolymer further comprises a divinylbenzene monomer that comprises one or more piperazine groups.

Aspect D1. A method of sample treatment, comprising: (a) adding a sample fluid comprising a sample that comprises at least one target analyte to a sorbent that comprises a silica component, a C4-C60 alkyl component, and an organic copolymer component comprising at least one hydrophobic organic monomer and at least one hydrophilic organic monomer, thereby resulting in sorbent with bound target analyte; and (b) adding an elution solution that comprises a protic solvent and a polar aprotic solvent to the sorbent, thereby desorbing the target analyte from the sorbent and forming a solution of the target analyte in the elution fluid.

Aspect D2. The method of aspect D1, wherein the sample further comprises phospholipids, wherein adding the sample fluid to the sorbent results in sorbent with bound phospholipids as well as the bound target analyte, and wherein adding the elution solution to the sorbent desorbs the target analyte from the sorbent while retaining at least 50% of the phospholipids on the sorbent.

Aspect D3. The method of any of aspects D1-D2, wherein the elution solution comprises a polar aprotic solvent selected from acetonitrile, acetone, tetrahydrofuran, methylene chloride, ethyl acetate, N,N-dimethylformamide, dimethyl sulfoxide and dimethyl ether.

Aspect D4. The method of any of aspects D1-D3, wherein the elution solution comprises a protic solvent selected from methanol, ethanol, 1-propanol, 2-propanol, t-butanol, acetic acid, formic acid, aqueous ammonia, methanolic ammonia, water, and blends thereof.

Aspect D5. The method of any of aspects D1-D2, wherein the elution solution comprises acetonitrile as a polar aprotic solvent and methanol as a protic solvent.

Aspect D6. The method of any of aspects D1-D5, wherein the elution solution comprises from 60 vol % to 100 vol % polar aprotic solvent and from 0 vol % to 40 vol % protic solvent.

Aspect D7. The method of any of aspects D1-D6, wherein the alkyl component of the sorbent is bound to the silica component.

Aspect D8. The method of any of aspects D1-D7, wherein the hydrophilic organic monomer comprises a monomer having the following formula,

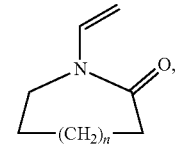

where n ranges from 1-3.

Aspect D9. The method of any of aspects D1-D8, wherein the hydrophobic organic monomer comprises divinylbenzene and, optionally, styrene.

Aspect D10. The method of any of aspects D1-D9, wherein the sorbent is not an ion exchange sorbent.

Aspect D11. The method of aspect D10, wherein the elution solution comprises acetonitrile and methanol in a ratio ranging from 70:30 to 95:5 vol/vol.

Aspect D12. The method of any of aspects D10-D11, wherein the sample fluid is prepared by combining the sample with a pretreatment solution that comprises a pretreatment compound, water, and an organic solvent.

Aspect D13. The method of aspect D12, wherein the organic solvent is a protic organic solvent.

Aspect D14. The method of any of aspects D12-D13, wherein the pretreatment compound is $H_3PO_4$, formic acid, acetic acid, sulfuric acid, or a blend thereof.

Aspect D15. The method of aspect D12, wherein the pretreatment solution comprises $H_3PO_4$, water and methanol.

Aspect D16. The method of aspect D12, wherein the pretreatment solution contains 3-5 wt % concentrated $H_3PO_4$ in water and methanol, which are provided in a ratio ranging from 92:8 to 97:3 vol/vol and the sample is combined with the pretreatment solution in a ratio ranging from 1:3 to 1:5 vol/vol.

Aspect D17. The method of any of aspects D10-D11, wherein the sample fluid is prepared by combining the sample with a pretreatment solution that comprises a pretreatment compound and water.

Aspect D18. The method of aspect D17, wherein the pretreatment solution comprises $H_3PO_4$ and water.

Aspect D19. The method of aspect D17, wherein the pretreatment solution contains 3-5 wt % concentrated $H_3PO_4$ in water and the sample is combined with the pretreatment solution in a ratio ranging from 2:3 to 2:1 vol/vol.

Aspect D20. The method of any of aspects D17-D19, further comprising adding a washing solution to the sorbent after adding the sample fluid and before adding the elution solution, the washing solution comprising water and an organic solvent.

Aspect D21. The method of aspect D20, wherein the washing solution comprises water and a protic organic solvent.

Aspect D22. The method of aspect D20, wherein the washing solution comprises water and methanol.

Aspect D23. The method of aspect D20, wherein the washing solution comprises water and methanol in a ratio ranging from 90:10 to 98:2.

Aspect D24. The method of any of aspects D1-D9, wherein the sorbent is a strong cation exchange sorbent.

Aspect D25. The method of aspect D24, wherein the organic copolymer component further comprises an organic monomer that comprises one or more sulfonate groups.

Aspect D26. The method of aspect D24, wherein the organic copolymer component further comprises a divinylbenzene monomer that comprises one or more sulfonate groups.

Aspect D27. The method of any of aspects D24-D26, wherein the target analyte is a basic target analyte.

Aspect D28. The method of any of aspects D1-9, wherein the sorbent is a weak anion exchange sorbent.

Aspect D29. The method of aspect D28, wherein the organic copolymer component further comprises an organic monomer that comprises one or more primary, secondary or tertiary amine groups.

Aspect D30. The method of aspect D28, wherein the organic copolymer component further comprises a divinylbenzene monomer that comprises one or more piperazine groups.

Aspect D31. The method of any of aspects D28-D30, the target analyte is a strong acid.

Aspect D32. The method of any of aspects D24-D31, wherein the elution solution comprises water and a basic compound.

Aspect D33. The method of aspect D32, wherein the basic compound selected from ammonium hydroxide ($NH_4OH$), NaOH, KOH, ammonium bicarbonate and combinations thereof.

Aspect D34. The method of any of aspects D24-D33, wherein the elution solution comprises acetonitrile and methanol in a ratio ranging from 60:40 to 100:0 vol/vol.

Aspect D35. The method of any of aspects D24-D34, wherein the elution solution comprises $NH_4OH$ (aq), acetonitrile and methanol.

Aspect D36. The method of any of aspects D24-D35, wherein elution solution comprises 3-8 wt % concentrated $NH_4OH$ in water.

Aspect D37. The method of any of aspects D24-D36, wherein the sample fluid comprises the sample combined with a pretreatment solution comprising an organic solvent and one or more pretreatment compounds.

Aspect D38. The method of aspect D37, wherein the organic solvent is a protic organic solvent.

Aspect D39. The method of aspect D37, wherein the protic organic solvent is methanol.

Aspect D40. The method of any of aspects D37-D39, wherein the one or more pretreatment compounds a selected from formic acid, carbonic acid, acetic acid.

Aspect D41. The method of aspect D40, wherein the one or more pretreatment compounds further comprise $H_3PO_4$.

Aspect D42. The method of aspect D37, wherein the pretreatment solution comprises methanol, formic acid and $H_3PO_4$.

Aspect D43. The method of aspect D37, wherein the pretreatment solution contains 1-4 wt % concentrated $H_3PO_4$ in water and 1-4 wt % formic acid in methanol and the sample is combined with the pretreatment solution in a ratio ranging from 1:3 to 1:6 vol/vol.

Aspect D44. The method of any of aspects D24-D36, wherein the sample fluid comprises the sample combined with a pretreatment solution that comprises water and a pretreatment compound.

Aspect D45. The method of aspect D44, wherein the pretreatment compound is selected from $H_3PO_4$, formic acid, acetic acid, sulfuric acid, or a blend thereof.

Aspect D46. The method of aspect D44, wherein the pretreatment compound is $H_3PO_4$.

Aspect D47. The method of aspect D44, wherein the pretreatment solution contains 2-8 wt % concentrated $H_3PO_4$ in water and the sample is combined with the pretreatment solution in a ratio ranging from 2:3 to 2:1 vol/vol.

Aspect D48. The method of any of aspects D44-D47, wherein the method further comprises adding a washing solution to the sorbent after adding the sample fluid and before adding the elution solution, the washing solution comprising an acidic compound and an organic solvent.

Aspect D49. The method of aspect D48, wherein the organic solvent is a protic organic solvent.

Aspect D50. The method of aspect D48, wherein the organic solvent is methanol.

Aspect D51. The method any of aspects D48-D50, wherein the acidic compound is selected from formic acid, carbonic acid, and acetic acid.

Aspect D52. The method of aspect D48, wherein the washing solution comprises formic acid and methanol.

Aspect D53. The method of aspect D48, wherein the washing solution contains 1-4 wt % formic acid in methanol.

Aspect D54. The method of any of aspects D44-D47, wherein the method further comprises (a) adding a first washing solution to the sorbent after adding the sample fluid and before adding the elution solution, the first washing solution comprising an acidic compound and water and (b) adding a second washing solution to the sorbent after adding the first washing fluid and before adding the elution solution, the second washing solution comprising an organic solvent.

Aspect D55. The method of aspect D54, wherein the acidic compound is selected from formic acid, carbonic acid, and acetic acid.

Aspect D56. The method of aspect D54, wherein the acidic compound is formic acid.

Aspect D57. The method of any of aspects D54-D56, wherein the organic solvent is a protic organic solvent.

Aspect D58. The method of any of aspects D54-D56, wherein the organic solvent is methanol.

Aspect D59. The method of aspect D54, wherein the first washing solution comprises formic acid in water and the second washing solution comprises methanol.

Aspect D60. The method of aspect D54, wherein the first washing solution contains 1-4 wt % formic acid in water and the second washing solution comprises methanol.

Aspect D61. The method of any of aspects D1-D9, wherein the sorbent is a strong anion exchange sorbent.

Aspect D62. The method of aspect D61, wherein the organic copolymer component further comprises an organic monomer that comprises one or more quaternary ammonium groups.

Aspect D63. The method of aspect D61, wherein the organic copolymer component further comprises an organic monomer that comprises one or more —$R_1N^+R_2R_3R_4$ groups, where $R_1$ is a C1-C8 alkylene group, and $R_2$, $R_3$ and $R_4$ are C1-C8 alkyl groups and may be the same or different.

Aspect D64. The method of aspect D61, wherein the organic copolymer component further comprises a divinylbenzene monomer that comprises one or more —$R_1N^+R_2R_3R_4$ groups, where $R_1$ is a C1-C8 alkylene group, and $R_2$, $R_3$ and $R_4$ are C1-C8 alkyl groups and may be the same or different.

Aspect D65. The method of any of aspects D63-D64, wherein w=1, x=0, y=0 and z=3.

Aspect D66. The method of any of aspects D61-D65, wherein the target analyte is an acidic target analyte.

Aspect D67. The method of any of aspects D1-D9, wherein the sorbent is a weak cation exchange sorbent.

Aspect 68. The method of aspect D67, wherein the organic copolymer component further comprises an organic monomer that comprises one or more carboxyl groups.

Aspect D69. The method of aspect D67, wherein the organic copolymer component further comprises a divinylbenzene monomer that comprises one or more carboxyl groups.

Aspect D70. The method of any of aspects D67-D69, wherein the target analyte is a strong base or a quaternary amine compound.

Aspect D71. The method of any of aspects D61-D70, wherein the elution solution comprises water and an acidic compound.

Aspect D72. The method of aspect D71, wherein the acidic compound is selected from formic acid, acetic acid, and carbonic acid.

Aspect D73. The method of any of aspects D61-D72, wherein the elution solution comprises acetonitrile and methanol in a ratio ranging from 65:35 to 85:15 vol/vol.

Aspect D74. The method of any of aspects D61-D73, wherein the elution solution comprises formic acid, acetonitrile and methanol.

Aspect D75. The method of any of aspects D61-D74, wherein elution solution comprises 1-4 wt % formic acid.

Aspect D76. The method of any of aspects D61-D75, wherein the sample fluid comprises the sample combined with a pretreatment solution that comprises an organic solvent and a pretreatment compound.

Aspect D77. The method of aspect D76, wherein the pretreatment compound is selected from $NH_4OH$, ammonium bicarbonate, pyridine, piperazine, and combinations thereof.

Aspect D78. The method of any of aspects D76-D77, wherein the organic solvent is a protic organic solvent.

Aspect D79. The method of any of aspects D76-D77, wherein the organic solvent is methanol.

Aspect D80. The method of aspect D76, wherein the pretreatment solution comprises $NH_4OH$ in methanol.

Aspect D81. The method of aspect D76, wherein the pretreatment solution contains 3-8 wt % concentrated $NH_4OH$ (aq) in methanol and the sample is combined with the pretreatment solution in a ratio ranging from 1:2 to 1:8 vol/vol.

Aspect D82. The method of any of aspects D61-D75, wherein the sample fluid comprises the sample combined with a pretreatment solution that comprises water and a pretreatment compound.

Aspect D83. The method of aspect D82, wherein the pretreatment compound is selected from $NH_4OH$, ammonium bicarbonate, pyridine, piperazine, and combinations thereof.

Aspect D84. The method of aspect D82, wherein the pretreatment solution contains 3-8 wt % concentrated $NH_4OH$ in water and the sample is combined with the pretreatment solution in a ratio ranging from 2:3 to 2:1 vol/vol.

Aspect D85. The method of any of aspects D82-D84, wherein the method further comprises adding a washing solution to the sorbent after adding the sample fluid and before adding the elution solution, the washing solution comprising a basic compound and an organic solvent.

Aspect D86. The method of aspect D85, wherein the basic compound is selected from ammonium hydroxide ($NH_4OH$), NaOH, KOH, and combinations thereof.

Aspect D87. The method of any of aspects D85-D86, wherein the organic solvent is a protic organic solvent.

Aspect D88. The method of any of aspects D85-D86, wherein the organic solvent is methanol.

Aspect D89. The method of aspect D85, wherein the washing solution comprises $NH_4OH$ and methanol.

Aspect D90. The method of aspect D85, wherein the washing solution contains 3-8 wt % conc. $NH_4OH$ (aq) in methanol.

Aspect D91. The method of any of aspects D82-D84, wherein the method further comprises (a) adding a first washing solution to the sorbent after adding the sample fluid and before adding the elution solution, the washing solution comprising a basic compound and water and (b) adding a second washing solution to the sorbent after adding the first washing fluid and before adding the elution solution, the second washing solution comprising an organic solvent.

Aspect D92. The method of aspect D91, wherein the basic compound is selected from ammonium hydroxide ($NH_4OH$), NaOH, KOH, ammonium bicarbonate, pyridine, piperazine, and combinations thereof.

Aspect D93. The method of aspect D91, wherein the basic compound is $NH_4OH$.

Aspect D94. The method of any of aspects D91-D93, wherein the organic solvent is a protic organic solvent.

Aspect D95. The method of any of aspects D91-D93, wherein the organic solvent is methanol.

Aspect D96. The method of aspect D91, wherein the first washing solution comprises $NH_4OH$ in water and the second washing solution comprises methanol.

Aspect D97. The method of aspect D96, wherein the first washing solution contains 3-8 wt % conc. $NH_4OH$ in water.

Aspect D98. The method of any of aspects D1-D97, wherein the sample is selected from a plasma sample and a serum sample.

Aspect E1. A kit comprising a sorbent that comprises a silica component, a C4-C60 alkyl component, and an organic copolymer component comprising a hydrophobic organic monomer and a hydrophilic organic monomer and one or more kit components selected from (a) an elution solution that comprises a protic solvent and a polar aprotic solvent (b) a pretreatment solution, (c) one or more washing solutions, (d) a collection plate or barrel, (e) a cap mat, (f) calibration and reference standards, and (g) Identification tagging for each component.

Aspect E2. The kit of aspect E1, wherein the sorbent is provided in multi-well strip, a multi-well plate, a column, or a single-use cartridge.

Aspect E3. The kit of any of aspects E1-E2, wherein the elution solution comprises a polar aprotic solvent selected from acetonitrile, acetone, tetrahydrofuran, methylene chloride, ethyl acetate, N,N-dimethylformamide, dimethyl sulfoxide and dimethyl ether.

Aspect E4. The kit of any of aspects E1-E3, wherein the elution solution comprises a protic solvent selected from methanol, ethanol, 1-propanol, 2-propanol, t-butanol, acetic acid, formic acid, aqueous ammonia, methanolic ammonia, water, and blends thereof.

Aspect E5. The kit of any of aspects E1-E2, wherein the elution solution comprises acetonitrile as a polar aprotic solvent and methanol as a protic solvent.

Aspect E6. The kit of any of aspects E1-E5, wherein the elution solution comprises from 60 vol % to 100 vol % polar aprotic solvent and from 0 vol % to 40 vol % protic solvent.

Aspect E7. The kit of any of aspects E1-E6, wherein the alkyl component of the sorbent is bound to the silica component.

Aspect E8. The kit of any of aspects E1-E7, wherein the hydrophilic organic monomer comprises a monomer having the following formula,

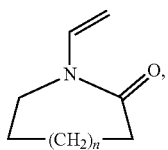

where n ranges from 1-3.

Aspect E9. The kit of any of aspects E1-E8, wherein the hydrophobic organic monomer comprises divinylbenzene and, optionally, styrene.

Aspect E10. The kit of any of aspects E1-E9, wherein the sorbent is not an ion exchange sorbent.

Aspect E11. The kit of aspect E10, wherein the elution solution comprises acetonitrile and methanol in a ratio ranging from 70:30 to 95:5 vol/vol.

Aspect E12. The kit of any of aspects E10-E11, wherein the pretreatment solution comprises a pretreatment compound, water, and an organic solvent.

Aspect E13. The kit of aspect E12, wherein the organic solvent is a protic organic solvent.

Aspect E14. The kit of any of aspects E12-E13, wherein the pretreatment compound is $H_3PO_4$, formic acid, acetic acid, sulfuric acid, or a blend thereof.

Aspect E15. The kit of aspect E12, wherein the pretreatment solution comprises $H_3PO_4$, water and methanol.

Aspect E16. The kit of aspect E12, wherein the pretreatment solution contains 3-5 wt % concentrated $H_3PO_4$ in water and methanol, which are provided in a ratio ranging from 92:8 to 97:3 vol/vol.

Aspect E17. The kit of any of aspects E10-E11, wherein the pretreatment solution comprises a pretreatment compound and water.

Aspect E18. The kit of aspect E17, wherein the pretreatment solution comprises $H_3PO_4$ and water.

Aspect E19. The kit of aspect E17, wherein the pretreatment solution contains 3-5 wt % concentrated $H_3PO_4$ in water.

Aspect E20. The kit of any of aspects E17-E19, wherein the washing solution comprises water and an organic solvent.

Aspect E21. The kit of aspect E20, wherein the washing solution comprises water and a protic organic solvent.

Aspect E22. The kit of aspect E20, wherein the washing solution comprises water and methanol.

Aspect E23. The kit of aspect E20, wherein the washing solution comprises water and methanol in a ratio ranging from 90:10 to 98:2.

Aspect E24. The kit of any of aspects E1-E9, wherein the sorbent is a strong cation exchange sorbent.

Aspect E25. The kit of aspect E24, wherein the organic copolymer component further comprises an organic monomer that comprises one or more sulfonate groups.

Aspect E26. The kit of aspect E24, wherein the organic copolymer component further comprises a divinylbenzene monomer that comprises one or more sulfonate groups.

Aspect E27. The kit of any of aspects E24-E26, wherein the kit is configured to remove matrix molecules from a sample containing a basic target analyte.

Aspect E28. The kit of any of aspects E1-E9, wherein the sorbent is a weak anion exchange sorbent.

Aspect E29. The kit of aspect E28, wherein the organic copolymer component further comprises an organic monomer that comprises one or more primary, secondary or tertiary amine groups.

Aspect E30. The kit of aspect E28, wherein the organic copolymer component further comprises a divinylbenzene monomer that comprises one or more piperazine groups.

Aspect E31. The kit of any of aspects E28-E30, wherein the kit is configured to remove matrix molecules from a sample containing a strong acid target analyte.

Aspect E32. The kit of any of aspects E24-E31, wherein the elution solution comprises water and a basic compound.

Aspect E33. The kit of aspect E32, wherein the basic compound selected from ammonium hydroxide ($NH_4OH$), NaOH, KOH, ammonium bicarbonate and combinations thereof.

Aspect E34. The kit of any of aspects E24-E33, wherein the elution solution comprises acetonitrile and methanol in a ratio ranging from 60:40 to 100:0 vol/vol.

Aspect E35. The kit of any of aspects E24-E34, wherein the elution solution comprises $NH_4OH$ (aq), acetonitrile and methanol.

Aspect E36. The kit of any of aspects E24-E35, wherein elution solution comprises 3-8 wt % concentrated $NH_4OH$ in water.

Aspect E37. The kit of any of aspects E24-E36, wherein the pretreatment solution comprising an organic solvent and one or more pretreatment compounds.

Aspect E38. The kit of aspect E37, wherein the organic solvent is a protic organic solvent.

Aspect E39. The kit of aspect E37, wherein the protic organic solvent is methanol.

Aspect E40. The kit of any of aspects E37-E39, wherein the one or more pretreatment compounds a selected from formic acid, carbonic acid, acetic acid.

Aspect E41. The kit of aspect E40, wherein the one or more pretreatment compounds further comprise $H_3PO_4$.

Aspect E42. The kit of aspect E37, wherein the pretreatment solution comprises methanol, formic acid and $H_3PO_4$.

Aspect E43. The kit of aspect E37, wherein the pretreatment solution contains 1-4 wt % concentrated $H_3PO_4$ in water and 1-4 wt % formic acid in methanol.

Aspect E44. The kit of any of aspects E24-E36, wherein the pretreatment solution comprises water and a pretreatment compound.

Aspect E45. The kit of aspect E44, wherein the pretreatment compound is selected from $H_3PO_4$, formic acid, acetic acid, sulfuric acid, or a blend thereof.

Aspect E46. The kit of aspect E44, wherein the pretreatment compound is $H_3PO_4$.

Aspect E47. The kit of aspect E44, wherein the pretreatment solution contains 2-8 wt % concentrated $H_3PO_4$ in water.

Aspect E48. The kit of any of aspects E44-E47, wherein the washing solution comprises an acidic compound and an organic solvent.

Aspect E49. The kit of aspect E48, wherein the organic solvent is a protic organic solvent.

Aspect E50. The kit of aspect E48, wherein the organic solvent is methanol.

Aspect E51. The method any of aspects E48-E50, wherein the acidic compound is selected from formic acid, carbonic acid, and acetic acid.

Aspect E52. The kit of aspect E48, wherein the washing solution comprises formic acid and methanol.

Aspect E53. The kit of aspect E48, wherein the washing solution contains 1-4 wt % formic acid in methanol.

Aspect E54. The kit of any of aspects E44-E47, wherein the kit comprises (a) a first washing solution that comprises an acidic compound and water and (b) a second washing solution that comprises an organic solvent.

Aspect E55. The kit of aspect E54, wherein the acidic compound is selected from formic acid, carbonic acid, and acetic acid.

Aspect E56. The kit of aspect E54, wherein the acidic compound is formic acid.

Aspect E57. The kit of any of aspects E54-E56, wherein the organic solvent is a protic organic solvent.

Aspect E58. The kit of any of aspects E54-E56, wherein the organic solvent is methanol.

Aspect E59. The kit of aspect E54, wherein the first washing solution comprises formic acid in water and the second washing solution comprises methanol.

Aspect E60. The kit of aspect E54, wherein the first washing solution contains 1-4 wt % formic acid in water and the second washing solution comprises methanol.

Aspect E61. The kit of any of aspects E1-E9, wherein the sorbent is a strong anion exchange sorbent.

Aspect E62. The kit of aspect E61, wherein the organic copolymer component further comprises an organic monomer that comprises one or more quaternary ammonium groups.

Aspect E63. The kit of aspect E61, wherein the organic copolymer component further comprises an organic monomer that comprises one or more $—R_1N^+R_2R_3R_4$ groups, where $R_1$ is a C1-C8 alkylene group, and $R_2$, $R_3$ and $R_4$ are C1-C8 alkyl groups and may be the same or different.

Aspect E64. The kit of aspect E61, wherein the organic copolymer component further comprises a divinylbenzene monomer that comprises one or more $—R_1N^+R_2R_3R_4$ groups, where $R_1$ is a C1-C8 alkylene group, and $R_2$, $R_3$ and $R_4$ are C1-C8 alkyl groups and may be the same or different.

Aspect E65. The kit of any of aspects E63-E64, wherein w=1, x=0, y=0 and z=3.

Aspect E66. The kit of any of aspects E61-E65, wherein the kit is configured to remove matrix molecules from a sample containing an acidic target analyte.

Aspect E67. The kit of any of aspects E1-E9, wherein the sorbent is a weak cation exchange sorbent.

Aspect E68. The kit of aspect E67, wherein the organic copolymer component further comprises an organic monomer that comprises one or more carboxyl groups.

Aspect E69. The kit of aspect E67, wherein the organic copolymer component further comprises a divinylbenzene monomer that comprises one or more carboxyl groups.

Aspect E70. The kit of any of aspects E67-E69, wherein the kit is configured to remove matrix molecules from a sample containing a target analyte that is a strong base or a quaternary amine compound.

Aspect E71. The kit of any of aspects E61-E70, wherein the elution solution comprises water and an acidic compound.

Aspect E72. The kit of aspect E71, wherein the acidic compound is selected from formic acid, acetic acid, and carbonic acid.

Aspect E73. The kit of any of aspects E61-E72, wherein the elution solution comprises acetonitrile and methanol in a ratio ranging from 65:35 to 85:15 vol/vol.

Aspect E74. The kit of any of aspects E61-E73, wherein the elution solution comprises formic acid, acetonitrile and methanol.

Aspect E75. The kit of any of aspects E61-E74, wherein elution solution comprises 1-4 wt % formic acid.

Aspect E76. The kit of any of aspects E61-E75, wherein the pretreatment solution comprises an organic solvent and a pretreatment compound.

Aspect E77. The kit of aspect E76, wherein the pretreatment compound is selected from $NH_4OH$, ammonium bicarbonate, pyridine, piperazine, and combinations thereof.

Aspect E78. The kit of any of aspects E76-E77, wherein the organic solvent is a protic organic solvent.

Aspect E79. The kit of any of aspects E76-E77, wherein the organic solvent is methanol.

Aspect E80. The kit of aspect E76, wherein the pretreatment solution comprises $NH_4OH$ in methanol.

Aspect E81. The kit of aspect E76, wherein the pretreatment solution contains 3-8 wt % concentrated $NH_4OH$ (aq) in methanol Aspect E82. The kit of any of aspects E61-E75, wherein the pretreatment solution comprises water and a pretreatment compound.

Aspect E83. The kit of aspect E82, wherein the pretreatment compound is selected from $NH_4OH$, ammonium bicarbonate, pyridine, piperazine, and combinations thereof.

Aspect E84. The kit of aspect E82, wherein the pretreatment solution contains 3-8 wt % concentrated $NH_4OH$ in water.

Aspect E85. The kit of any of aspects E82-E84, wherein the washing solution comprising a basic compound and an organic solvent.

Aspect E86. The kit of aspect E85, wherein the basic compound is selected from ammonium hydroxide ($NH_4OH$), NaOH, KOH, and combinations thereof.

Aspect E87. The kit of any of aspects E85-E86, wherein the organic solvent is a protic organic solvent.

Aspect E88. The kit of any of aspects E85-E86, wherein the organic solvent is methanol.

Aspect E89. The kit of aspect E85, wherein the washing solution comprises $NH_4OH$ and methanol.

Aspect E90. The kit of aspect E85, wherein the washing solution contains 3-8 wt % conc. $NH_4OH$ (aq) in methanol.

Aspect E91. The kit of any of aspects E82-E84, wherein the kit comprises (a) a first washing solution comprising a basic compound and water and (b) a second washing solution comprising an organic solvent.

Aspect E92. The kit of aspect E91, wherein the basic compound is selected from ammonium hydroxide (NH₄OH), NaOH, KOH, ammonium bicarbonate, pyridine, piperazine, and combinations thereof.

Aspect E93. The kit of aspect E91, wherein the basic compound is NH₄OH.

Aspect E94. The kit of any of aspects E91-E93, wherein the organic solvent is a protic organic solvent.

Aspect E95. The kit of any of aspects E91-E93, wherein the organic solvent is methanol.

Aspect E96. The kit of aspect E91, wherein the first washing solution comprises NH₄OH in water and the second washing solution comprises methanol.

Aspect E97. The kit of aspect E96, wherein the first washing solution contains 3-8 wt % conc. NH₄OH in water.

These and other aspects, as well as numerous embodiments and advantages associated with the methods, kits and sorbents, and devices described in the present disclosure will become immediately apparent to those of ordinary skill in the art upon review of the detailed description and claims to follow.

BRIEF DESCRIPTION OF THE DRAWINGS

FIG. 5 shows specific reagent amounts and reaction conditions for Example 2.

FIG. 6 shows analytical data for the hybrid particles of Example 2a.

DETAILED DESCRIPTION

Figure 1:
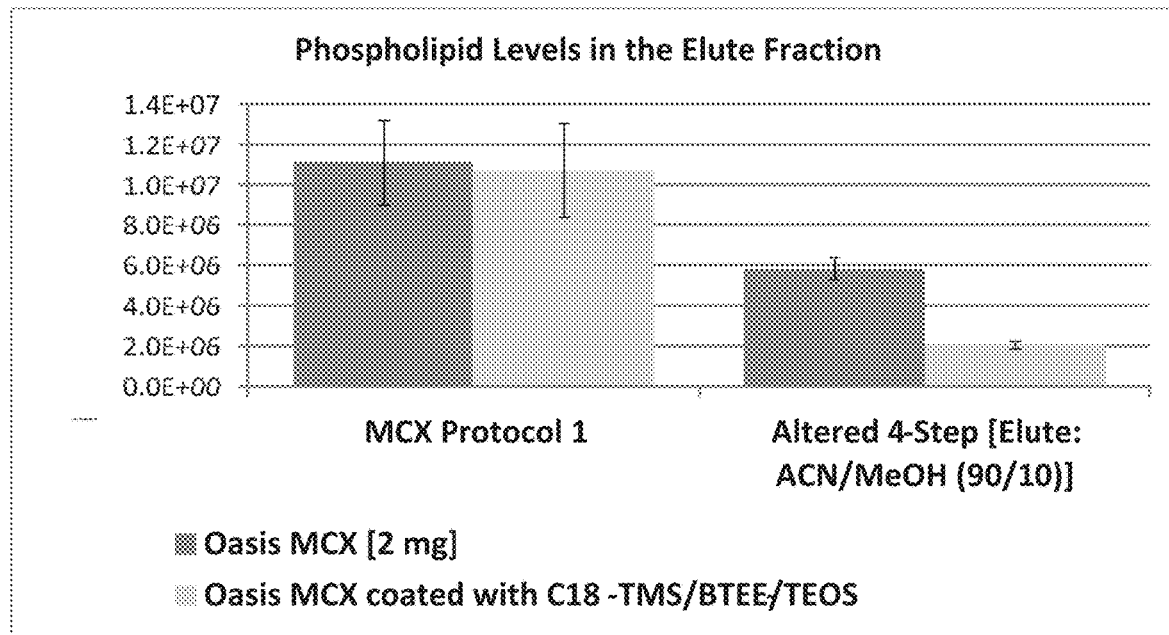
FIG. 1 shows total phospholipid content (TIC peak area) levels in elute fraction for Oasis MCX™ sorbent particles compared to particles in accordance with the present disclosure, using a preexisting method protocol and a method protocol in accordance with the present disclosure.

The present disclosure relates to sorbents, devices, kits and methods that may be used for treatment of biological samples, including removal of matrix molecules from a biological sample that contains (or potentially contains) an analyte of interest, including removal of salts and phospholipids in order to clean-up and/or concentrate analytes of interest by Solid Phase Extraction (SPE).

Sorbents

Sorbents in accordance with the present disclosure include sorbents that comprises (a) a silica component, (b) an organic copolymer component comprising at least one hydrophobic organic monomer and at least one hydrophilic organic monomer and, optionally, (c) a C4-C60 alkyl component, typically C4-C50 alkyl component, more typically a C8-C30 alkyl component, and even more typically, a C12-C18 alkyl component. In this regard, the following description of various compounds having C4-C60 alkyl components is to be understood as likewise a description of the same compounds having a C4-C50 alkyl components, a C8-C30 alkyl components, or a C12-C18 alkyl components. Moreover, the following description of various compounds having a C4-C60 alkyl components is to be understood to include a C4-C60 alkyl-silyl components.

Sorbents for use in the present disclosure may comprise sorbent particles, which may vary widely in size and may range, for example, from about 5 to about 60 μm in diameter, among other possible particle sizes. Sorbent particles for use in conjunction with the present disclosure may be porous or non-porous.

As used herein, "hydrophilic" means having an affinity for, attracting, adsorbing or absorbing water, and "hydrophobic" means lacking an affinity for, repelling, or failing to adsorb or absorb water.

As used herein, "polymers" are molecules containing repeating subunits.

As used herein, "organic polymers" are organic molecules containing repeating subunits.

The term "monomer", as used herein, refers to both a molecule comprising one or more polymerizable functional groups prior to polymerization, and a repeating subunit of a polymer. As a specific example, the following polymerizable monomer,

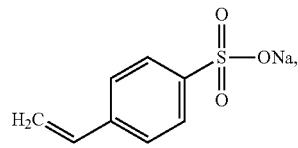

and the following incorporated monomer,

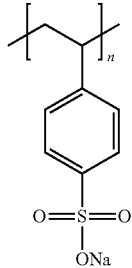

(where n is 1), may be each be referred to herein as a "styrene sulfonate monomer," regardless of when the sulfonate group is introduced (e.g., formed by polymerization of

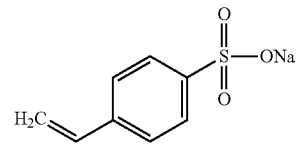

or formed by polymerization of styrene followed by sulfonation of the incorporated monomer) It is noted that incorporated monomers may be named independently of the organic monomer that was polymerized to form the polymer. For instance, in the preceding example, the incorporated styrene sulfonate monomer may, in theory, be formed from a free styrene sulfonate monomer or from a styrene monomer that is first polymerized and later subjected to a sulfonation process. In either case, the incorporated monomer may be referred to herein as a "styrene sulfonate monomer".

Organic polymers may take on a number of configurations, which may be selected, for example, from linear, cyclic and branched configurations, among others. Branched configurations include star-shaped configurations (e.g., configurations in which three or more chains emanate from a single branch region), comb configurations (e.g., configurations having a polymer backbone and a plurality of side chains, also referred to as "graft" configurations), dendritic configurations (e.g., arborescent and hyperbranched polymers), networked (e.g., crosslinked) configurations, and so forth.

As used herein, organic polymers include "organic homopolymers," which are polymers that contain multiple copies of a single organic monomer, and "organic copolymers," which are organic polymers that contain multiple copies of at least two dissimilar organic monomers, examples of which include random, statistical, gradient, periodic (e.g., alternating) and block copolymers, among others.

Sorbent Copolymer Component

With regard to the organic copolymer component of the sorbent that comprises at least one hydrophobic organic monomer and at least one hydrophilic organic monomer, in certain embodiments, the hydrophilic organic monomer may be selected from organic monomers having an amide group, organic monomers having an ester group, organic monomers having a carbonate group, organic monomers having a carbamate group, organic monomers having a urea group, organic monomers having a hydroxyl group, and organic monomers having nitrogen-containing heterocyclic group, among other possibilities. Specific examples of hydrophilic organic monomers include, for example, 2-vinylpyridine, 3-vinylpyridine, 4-vinylpyridine, N-vinylpyrrolidone, N-vinyl-piperidone, N-vinyl caprolactam, lower alkyl acrylates (e.g., methyl acrylate, ethyl acrylate, etc.), lower alkyl methacrylates (e.g., methyl methacrylate, ethyl methacrylate, etc.), vinyl acetate, acrylamide or methacrylamide, hydroxypolyethoxy allyl ether, ethoxy ethyl methacrylate, ethylene glycol dimethacrylate, or diallyl maleate. In certain beneficial embodiments, the hydrophilic organic monomer may be a monomer having the following formula,

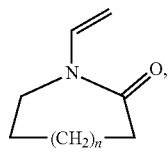

where n ranges from 1-3 (i.e., N-vinyl pyrrolidone, N-vinyl-2-piperidinone or N-vinyl caprolactam).

In certain embodiments, the hydrophobic monomer of the organic copolymer component may comprise a C6-C18 monocyclic or multicyclic carbocyclic group, e.g., a phenyl group or a phenylene group. Specific examples of hydrophobic monomers include, for example, monofunctional and multifunctional aromatic monomers such as styrene and divinylbenzene, monofunctional and multifunctional olefin monomers such as ethylene, propylene or butylene, polycarbonate monomers, ethylene terephthalate, monofunctional and multifunctional fluorinated monomers such as fluoroethylene, 1,1-difluoroethylene), tetrafluoroethylene, chlorotrifluoroethylene, hexafluoropropylene, perfluoropropylvinylether, or perfluoromethylvinylether, monofunctional or multifunctional acrylate monomers having a higher alkyl group, monofunctional or multifunctional acrylate monomers having a C6-C18 saturated, unsaturated or aromatic carbocyclic group, monofunctional or multifunctional methacrylate monomers having a higher alkyl group, monofunctional or multifunctional methacrylate monomers having a C6-C18 saturated, unsaturated or aromatic carbocyclic group, among others. In certain embodiments, DVB 80 may be employed, which is a monomer mixture that comprises divinylbenzene (80%) as well as a mixture of ethyl-styrene isomers, diethylbenzene, and can include other isomers as well.

In certain embodiments, the organic copolymer component will comprise a multifunctional hydrophobic organic monomer such as divinylbenzene and/or a multifunctional hydrophilic organic monomer, such as ethylene glycol dimethacrylate, methylene bisacrylamide or allyl methacrylate, in order to provide crosslinks in the organic copolymer.

In certain embodiments, the organic copolymer component may comprise n-vinyl pyrrolidone or n-vinyl caprolactam as a hydrophilic organic monomer and divinylbenzene as a hydrophobic organic monomer.

In certain embodiments, the organic copolymer may comprise an organic monomer that comprises one or more anionic groups and/or an organic monomer that comprises one or more cationic groups, for example, to provide the sorbent with ion exchange characteristics.

The organic copolymer may comprise, for example, an organic monomer that provides strong cation exchange characteristics, in particular, an organic monomer having one or more anionic groups that maintain a negative charge over a wide pH range such as, for instance, sulfonate groups. In particular embodiments, the organic monomer may be a sulfonyl-substituted divinyl benzene monomer. Monomers having one or more sulfonate groups may be incorporated in the copolymer, for example, by polymerizing the copolymer from a monomer mixture that includes a sulfonated free monomer or by subjecting a previously formed copolymer to a sulfonation process, for instance, by exposing the previously formed copolymer to concentrated sulfuric acid. For example, in copolymers formed from divinyl benzene, previously polymerized divinyl benzene monomers may sulfonated in this fashion.

The organic copolymer may comprise, for example, an organic monomer that provides strong anion exchange characteristics, in particular, an organic monomer having one or cationic groups that maintain a positive charge over a wide pH range such as quaternary ammonium groups, for instance, an organic monomer that comprises one or more $-R_1-N^+R_2R_3R_4$ groups, where $R_1$ is an alkylene group, typically, a C1-C8 alkylene group (i.e., selected from C1, C2, C3, C4, C5, C6, C7, and C8 alkylene groups), and $R_2$, $R_3$ and $R_4$ may be the same or different and are alkyl groups, typically, C1-C8 alkyl groups (i.e., selected from C1, C2, C3, C4, C5, C6, C7, and C8 alkyl groups). As a specific example, after formation of a copolymer that comprises divinylbenzene, the divinylbenzene monomer within the copolymer can be chloromethylated, followed by amination as described, for example, in U.S. Pat. No. 7,442,299, which is hereby incorporated by reference. In the present case, a tertiary amine may be used to form a quaternary amine upon reaction. In particular embodiments, the organic monomer may be a quaternary-ammonium-substituted divinyl benzene monomer.

The organic copolymer may comprise, for example, an organic monomer that provides weak cation ion exchange characteristics, in particular, an organic monomer having one or more anionic groups that become neutralized at lower pH levels such as, for instance, carboxylate groups. As a specific example, after formation of a copolymer that comprises divinylbenzene, the divinylbenzene monomer within the copolymer can be chloromethylated, followed by oxidation to form carboxylic acid groups. In particular embodiments, the organic monomer may be a carboxyl-substituted divinyl benzene monomer.

The organic copolymer may comprise, for example, an organic monomer that provides weak anion exchange characteristics, in particular, an organic monomer having one or cationic groups that become neutralized at higher pH levels such as, for instance, primary, secondary or tertiary amine groups, for example, piperazinyl, N-methylpiperazinyl, pyrazinyl, piperidinyl, morpholino, pyrrolidinyl, quinolinyl, pyridyl, pyrimidyl, pyrrolyl, or indolyl groups or phosphate (3-) or carbonate (2-) groups. As a specific example, after formation of a copolymer that comprises divinylbenzene, the divinylbenzene monomer within the copolymer can be chloromethylated, followed by amination as described, for example, in U.S. Pat. No. 7,731,844, which is hereby incorporated by reference. In particular embodiments, the organic monomer may be a piperazinyl-substituted divinyl benzene monomer.

In certain embodiments, the organic copolymer may further comprise an alkenyl-functionalized organosilane monomer, thereby providing the organic copolymer with organosilane groups, as discussed in detail further below. Specific examples of alkenyl-functionalized organosilane monomers include 3-(trimethoxysilyl)propyl methacrylate (also so known as 3-methacryloxypropyltrimethoxysilane, or MAPTMOS, vinyltriethoxysilane (VTES), methacryloxypropyltriethoxysilane, vinyltrimethoxy silane, N-(3-acryloxy-2-hydroxypropyl)-3-aminopropyltriethoxysilane, (3-acryloxypropyl)trimethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropylmethyldiethoxysilane, methacryloxypropylmethyldimethoxysilane, methacryloxypropyltris(methoxyethoxy)silane, 3-(N-styrylmethyl-2-aminoethylamino)propyltrimethoxysilane hydrochloride, among others.

Sorbent Silica Component

With regard to the silica component of the sorbent, the silica may either be in the form of substantially pure silica (corresponding to the case of n=0 in the formulas to follow) or may comprise material having the formula $SiO_2/(R^2_p R^4_q SiO_t)_n$ or the formula $SiO_2/[R^6(R^2_r SiO_t)_m]_n$ wherein $R^2$ and $R^4$ are independently C1-C18 aliphatic or aromatic moieties, $R^6$ is a substituted or unsubstituted C1-C18 alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 or less to 1, for example, ranging from 0.03 to 0.1 to 0.2 to 0.3 to 0.4 to 0.5 to 0.6 to 0.7 to 0.8 to 0.9 to 0.95 to 1) (i.e., ranging between any two of the preceding values).

In various embodiments, the silica component is formed by hydrolytically condensing one or more silane compounds, which typically include (a) one or more silane compounds of the formula $SiZ_1Z_2Z_3Z_4$, where $Z_1$, $Z_2$, $Z_3$ and $Z_4$ are independently selected from Cl, Br, I, C1-C4 alkoxy, C1-C4 alkylamino, and C1-C4 alkyl, although at most three of $Z_1$, $Z_2$, $Z_3$ and $Z_4$ can be C1-C4 alkyl, for example, tetraalkoxysilanes, including, tetra-C1-C4-alkoxysilanes such as tetramethoxysilane, tetraethoxysilane, tetrachlorosilane, methyl-triethoxysilane, and methyl-trichlorosilane, among others, and alkyl-trialkoxysilanes, typically C1-C4-alkyl-tri-C1-C4-alkoxysilanes, such as methyl-triethoxysilane, among others. and/or (b) one or more compounds of the formula $Si\ Z_1Z_2Z_3—R—SiZ_4Z_5Z_6$, where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl, and where $Z_4$, $Z_5$ and $Z_6$ are independently selected from Cl, Br, I, C1-C4 alkoxy, C1-C4 alkylamino, and C1-C4 alkyl, although at most two of $Z_4$, $Z_5$ and $Z_6$ can be C1-C4 alkyl, for example, bis(trialkoxysilyl)alkanes, typically, bis(tri-C1-C4-alkoxysilyl)C1-C4-alkanes such as bis(triethoxysilyl)ethane, among others. Numerous suitable organosilane compounds are set forth in U.S. Pat. No. 6,686,035, the disclosure of which is hereby incorporated by reference.

In certain embodiments, the silica component may include a hydrolytically condensed alkenyl-functionalized organosilane monomer, thereby providing the silica component with alkene groups from which organic polymerization can proceed. Specific examples of alkenyl-functionalized organosilane monomers are listed above and include 3-(trimethoxysilyl)propyl methacrylate (MAPTMOS) and vinyltriethoxysilane (VTES), among others.

In embodiments where the sorbent is provided with a C4-C60 alkyl component, the silica component may include a hydrolytically condensed C4-C60-alkyl-functionalized organosilane compound, such as, for example, a compound of the formula $RSiZ_1Z_2Z_3$, where R is C4-C60 alkyl and where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl, specific examples of which include a C4-C60-alkyl-tri-C1-C3-alkoxysilane, a C4-C60-alkyl-trichlorosilane, a C4-C60-alkyl-tri-C1-C3-alkylaminosilane, a C4-C60-alkyl-C1-C3-alkoxydichlorosilane, a C4-C60-alkyl-di-C1-C3-alkoxysilane, a C4-C60-alkyl-C1-C3-alkyl-dichlorosilane, a C4-C60-alkyl-C1-C3-dialkyl-C1-C3-alkoxysilane, and a C1-C3-dialkyl-C4-C60-alkylchlorosilane. Specific examples of C4-C60-alkyl-functionalized organosilane compounds include octadecyltrimethoxysilane, octadecyltriethoxysilane, octadecyltrichlorosilane, octadecyltri(dimethylamino)silane, methyloctadecyldimethoxysilane, methyloctadecyldiethoxysilane, methyloctadecyldichlorosilane, methyloctadecyldi(dimethylamino)silane, dimethyloctadecylmethoxysilane, dimethyloctadecylethoxysilane, dimethyloctadecylchlorosilane, dimethyloctadecyldimethylaminosilane, diisopropyloctadecylmethoxysilane, diisopropyloctadecylethoxysilane, diisopropyloctadecylchlorosilane, diisopropyloctadecyldimethylaminosilane, octyltrimethoxysilane, octyltriethoxysilane, octyltrichlorosilane, octyltri(dimethylamino) silane, methyloctyldimethoxysilane, methyloctyldiethoxysilane, methyloctyldichlorosilane, methyloctyldi(dimethylamino)silane, dimethyloctylmethoxysilane, dimethyloctylethoxysilane, dimethyloctylchlorosilane, dimethyloctyldimethylaminosilane, diisopropyloctylmethoxysilane, diisopropyloctylethoxysilane, diisopropyloctylchlorosilane, diisopropyloctyldimethylaminosilane, butyltrimethoxysilane, butyltriethoxysilane, butyltrichlorosilane, butyltri(dimethylamino)silane, methylbutyldimethoxysilane, methylbutyldiethoxysilane, methylbutyldichlorosilane, methylbutyldi(dimethylamino)silane, dimethylbutylmethoxysilane, dimethylbutylethoxysilane, dimethylbutylchlorosilane, dimethylbutyldimethylaminosilane, diisopropylbutylmethoxysilane, diisopropylbutylethoxysilane, diisopropylbutylchlorosilane, and diisopropylbutyldimethylaminosilane.

Sorbent Particles with Organic Copolymer Core Region and Inorganic Surface Region In certain embodiments, sorbent particles in accordance with the present disclosure include (a) a core region that comprises an organic copolymer comprising (i) at least one hydrophobic organic monomer, (ii) at least one hydrophilic organic monomer, (iii) optionally, an organic monomer that comprises one or more anionic groups and/or an organic monomer that comprises one or more cationic groups and/or an organic monomer that comprises one or more zwitterionic groups (where ion exchange capability is desired), and (iv) optionally, an alkenyl-functionalized organosilane monomer, and (b) a surface region that comprises a silica component and, optionally, a C4-C60 alkyl component. The association of the one or more alkenyl-functionalized organosilane monomers with the organic copolymer of the core region provides organosilane groups which can further participate in hydrolytic condensation, which may in turn improve bonding between the core region and the surface region.

It is noted that, where the organic polymer comprises an organic monomer that comprises one or more anionic groups, one or more cationic groups and/or one or more zwitterionic groups, such charged groups may be introduced during polymer formation by selecting a polymerizable monomer having such groups and/or such groups may be introduced after a precursor organic polymer is formed via suitable chemical process. As a specific example, monomers having one or more sulfonate groups may be formed in the copolymer, for example, by polymerizing the copolymer from a monomer mixture that includes a sulfonated free monomer (e.g., styrene sulfonate) or by subjecting a previously formed copolymer (e.g., an organic copolymer comprising incorporated styrene monomers) to a sulfonation process (e.g., sulfonating at least a portion of the styrene monomers in the organic polymer to form incorporated styrene sulfonate monomers).

Examples of hydrophobic organic monomers, hydrophilic organic monomers, organic monomers that comprise cationic groups, organic monomers that comprise anionic groups, and alkenyl-functionalized organosilane monomers that may be used to form the core region are described above. Examples of organosilane compounds that may be hydrolytically condensed to form the surface region are also described above.

In various embodiments, the surface region may be formed by hydrolytically condensing one or more organosilane compounds at the surface region of a previously formed particle core that comprises an organic copolymer comprising (i) at least one hydrophobic organic monomer, (ii) at least one hydrophilic organic monomer, (iii) optionally, an organic monomer that comprises one or more anionic groups and/or an organic monomer that comprises one or more cationic groups and/or an organic monomer that comprises one or more zwitterionic groups, and (iv) optionally, an alkenyl-functionalized organosilane monomer.

For instance, in some embodiments, the one or more organosilane compounds that are hydrolytically condensed may comprise one or more alkoxysilane compounds, for example, one or more silane compounds of the formula $SiZ_1Z_2Z_3Z_4$, described above, among others, and optionally, a C4-C60-alkyl-functionalized organosilane compound, for example, of the formula $RSiZ_1Z_2Z_3$ described above, among others. Where a C4-C60-alkyl-functionalized organosilane compound is included, this compound may be hydrolytically condensed simultaneously with the one or more alkoxysilane compounds, or the one or more alkoxysilane compounds may be hydrolytically condensed, followed by hydrolytic condensation of the C4-C60-alkyl-functionalized organosilane compound.

As indicated above, in some embodiments, one or more alkenyl-functionalized organosilane monomers, such as those discussed above, among others, may be associated with the organic copolymer of the core region. For example, the one or more alkenyl-functionalized organosilane monomers may be associated with the organic copolymer of the core region by copolymerization of the one or more alkenyl-functionalized organosilane monomers along with (i) the at least one hydrophobic organic monomer, (ii) the at least one hydrophilic organic monomer, and (iii) the optional organic monomer that comprises one or more anionic groups and/or organic monomer that comprises one or more cationic groups and/or an organic monomer that comprises one or more zwitterionic groups.

As another example, the one or more alkenyl-functionalized organosilane monomers may be associated with the organic copolymer of the core region by first forming an organic copolymer that comprises the at least one hydrophobic organic monomer, the at least one hydrophilic organic monomer, and the optional at least one organic monomer that comprises one or more anionic groups and/or organic monomer that comprises one or more cationic groups and/or an organic monomer that comprises one or more zwitterionic groups, followed by reaction of the one or more alkenyl-functionalized organosilane monomers with the organic copolymer, for example, via residual unsaturation in the organic copolymer. This step may be conducted after copolymerization and before core formation in some embodiments. This step may also be conducted after copolymerization and core formation in various embodiments.

Sorbent Particles with Inorganic Core Region and Organic Copolymer Surface Region In certain embodiments, sorbent particles in accordance with the present disclosure may include (a) a core region that comprises a silica component and (b) a surface region that comprises an organic copolymer having (i) at least one hydrophobic organic monomer (ii) at least one hydrophilic organic monomer and (iii) optionally, an organic monomer that comprises one or more anionic groups and/or an organic monomer that comprises one or more cationic groups.

Particular examples of hydrophobic organic monomers, hydrophilic organic monomers, organic monomers that comprise cationic groups, and organic monomers that comprise anionic groups are provided above. Particular examples of organic monomers that comprise zwitterionic groups can be found, for example, in André Laschewsky, "Structures and Synthesis of Zwitterionic Polymers," *Polymers* 2014, 6(5), 1544-1601; doi:10.3390/polym6051544 and include N-(2-methacryloyloxy)ethyl-N,N-dimethylammonio propanesulfonate (SPE), N-(3-methacryloylimino) propyl-N,N-dimethylammonio propanesulfonate (SPP), 2-(methacryloyloxy)ethylphosphatidylcholine (MPC), and 3-(2'-vinyl-pyridinio)propanesulfonate (SPV), which are commercially available.

In certain embodiments, the core region is formed by hydrolytically condensing one or more silane compounds. Various silane compounds that may be hydrolytically condensed to form the core region, including various alkoxysilane compounds, are described above.

In certain embodiments, the sorbent particles may further optionally include a C4-C60 alkyl component. In those embodiments, the one or more silane compounds that are hydrolytically condensed to form the core region may further comprise a C4-C60-alkyl-functionalized organosilane compound, or one or more silane compounds that do not include a C4-C60-alkyl-functionalized organosilane compound may be hydrolytically condensed, followed by reaction with a C4-C60-alkyl-functionalized organosilane compound. Various C4-C60-alkyl-functionalized organosilane compounds that may be hydrolytically condensed are described above.

In certain embodiments, the sorbent particles may be formed using an alkenyl-functionalized organosilane species. For example, the one or more silane compounds that are hydrolytically condensed to form the core region may further comprise an alkenyl-functionalized organosilane compound. As another example, one or more silane compounds that do not include an alkenyl-functionalized organosilane may be hydrolytically condensed, followed by reaction with an alkenyl-functionalized organosilane compound. Various alkenyl-functionalized organosilane compounds are described above. The resulting alkene groups at the surface of the particle core may be used for forming a covalent bond between the particle core and the surface region containing the organic polymer.

In some embodiments, the surface region that comprises the organic copolymer is formed by a process that comprises an addition polymerization of (i) at least one hydrophobic organic monomer (ii) at least one hydrophilic organic monomer and (iii) optionally, an organic monomer that comprises one or more anionic groups and/or an organic monomer that comprises one or more cationic groups. Examples of addition polymerization reactions include, for instance, anionic polymerizations, cationic polymerizations, or radical polymerization reactions, including living radical polymerization reactions such as Reversible Addition-Fragmentation Chain Transfer Polymerization (RAFT), Atom Transfer Radical Polymerization (ATRP), and stable free radical (SFR) polymerizations (e.g., iniferter based polymerizations), among other possibilities.

In some embodiments, the surface region that comprises the organic copolymer may be formed by a process that comprises forming the organic copolymer and grafting the organic copolymer onto a surface of the core region (i.e., by a "grafting to" process). In some embodiments, the surface region that comprises the organic copolymer may be formed by a process that comprises polymerizing the organic copolymer from sites on the surface of the core region (by a "grafting from" process). For instance, where alkene groups are present at the surface of the core region, for example as a result of hydrolytic condensation of an alkenyl-functionalized organosilane compound during the formation of the core region, the alkene groups may be used as initiation sites for the polymerization of the organic copolymer.

In embodiments where the sorbent particles further comprise a C4-C60-alkyl component, the organic copolymer may further comprise one or more C4-C60 alkyl groups. For example, the organic monomers polymerized to form the organic copolymer may further include a C4-C-60-alkyl functionalized unsaturated monomer, or a C4-C-60-alkyl-group may be attached to the organic copolymer.

Additional Sorbent Particles

In certain embodiments, sorbent particles in accordance with the present disclosure may comprise an organic copolymer that comprises (i) at least one hydrophilic organic monomer, (ii) at least one hydrophobic organic monomer, (iii) at least one alkenyl-functionalized organosilane monomer, and (iv) optionally, an organic monomer that comprises one or more anionic groups and/or an organic monomer that comprises one or more cationic groups. Specific examples of hydrophobic organic monomers, hydrophilic organic monomers, organic monomers that comprise cationic groups, organic monomers that comprise anionic groups, organic monomers that comprise zwitterionic groups, and alkenyl-functionalized organosilane monomers that may be used to form the organic copolymer are provided above.

The sorbent particles may be further modified by the addition of a C4-C60 alkyl component. For example, a C4-C60 alkyl component may be added by hydrolytic condensation of a C4-C60-alkyl-functionalized organosilane compound. Various C4-C60-alkyl-functionalized organosilane compounds that may be hydrolytically condensed are described above.

Devices

Devices in accordance with the present disclosure commonly include sorbents such as those described hereinabove in a packed sorbent bed.

Devices in accordance with the present disclosure commonly include a housing having a chamber for accepting and holding sorbent. In various embodiments, the housing may be provided an inlet and an outlet. The construction materials for the housing include inorganic materials, for instance, metals such as stainless steel and ceramics such as glass, as well as synthetic polymeric materials such as polyethylene, polypropylene, polyether ether ketone (PEEK), and polycarbonate, among others.

In certain embodiments, the device may include one or more filters which act to hold the sorbent in a housing. Exemplary filters may be, for example, in a form of membrane, screen, frit or spherical porous filter.

In certain embodiments, a solution received in the housing may flow into the sorbent spontaneously, for example, capillary action. Alternatively, the flow may be generated through the sorbent by external forces, such as gravity or centrifugation, or by applying a vacuum to an outlet of the housing or positive pressure to an inlet of the housing.

Specific examples of housings for use in the present disclosure include, for example, a syringe, an injection cartridge, a column (e.g., a microbore column, capillary column or nanocolumn), a multi-well device such as a 4 to 8-well rack, a 4 to 8-well strip, a 48 to 96-well plate, a 96 to 384-well micro-elution plate, micro-elution tip devices, including a 4 to 8-tip micro-elution strip, a 96 to 384-micro-elution tip array, a single micro-elution pipet tip, a thin layer plate, a microtiter plate, a spin tube, or a spin container, among others.

Multi-well formats are commonly used with robotic fluid dispensing systems. Typical multi-well formats include 48-, 96-, and 384-well standard plate formats, although other formats are clearly possible.

Methods

As previously noted, the present disclosure also pertains to methods that may be used for removal of matrix molecules from a sample that contains an analyte of interest, including the removal phospholipids to clean-up and/or concentrate analytes of interest by Solid Phase Extraction (SPE). Such methods can be used in conjunction with various commercially available sorbents, including Oasis HLB™ sorbent particles, Oasis MCX™ sorbent particles, Oasis WCX™ sorbent particles, Oasis MAX™ sorbent particles and Oasis WAX™ sorbent particles, as well as the various sorbents described elsewhere herein, among others.

In various aspects, methods of performing a sample treatment procedure are provided which comprise: (a) adding a sample fluid comprising a sample that comprises at least one target analyte to a sorbent that comprises an organic copolymer component comprising at least one hydrophobic organic monomer and at least one hydrophilic organic monomer, a silica component, and a C4-C60 alkyl component, thereby yielding a sorbent with bound target analyte and (b) adding an elution solution that comprises a protic solvent and a polar aprotic solvent to the sorbent, thereby desorbing the target analyte from the sorbent and forming a solution of the target analyte in the elution fluid.

In various embodiments, a sample fluid that comprises at least one target analyte and one or more phospholipids is added to the sorbent, thereby yielding a sorbent with bound target analyte and bound phospholipids, with subsequent addition of the elution solution resulting in desorption of the target analyte from the sorbent, thereby forming a solution of the target analyte in the elution fluid, while at the same time retaining at least 50% of the phospholipids on the sorbent, preferably, 70-100% of the phospholipids on the sorbent, more preferably 85-100% of the phospholipids on the sorbent, and even more preferably 90-100% of the phospholipids on the sorbent, Particular examples of sorbents are described above, although any suitable sorbent that comprises (a) an organic copolymer component comprising at least one hydrophobic organic monomer and at least one hydrophilic organic monomer, (b) a silica component, and (c) a C4-C60 alkyl component may be employed.

Particular examples of organic copolymer components, including particular examples of hydrophobic organic monomers and hydrophilic organic monomers, particular examples of silica components, and particular examples of C4-C60 alkyl components are described above.

In various embodiments, the sample fluid is or is derived from a biological sample. Exemplary biological samples include any biological sample that contains or potentially contains phospholipids, such as biological fluids (e.g., whole blood samples, blood plasma samples, serum samples, oral fluids, urine, etc.), biological tissues, biological matrices, cells (e.g., one or more types of cells), cell culture supernatants, foods that contain phospholipids (e.g., meats, whole grains, legumes, eggs, etc.), and food extracts.

As indicated above, the methods of performing sample enrichment described herein include a step where a sample fluid that comprises or potentially comprises at least one target analyte is added to a sorbent. Such a process frequently referred to as a "loading" process, and commonly involves passing the sample fluid through a device that contains the sorbent (such devices are described in more detail below). During loading, the one or more target analytes, if present, along with various non-target substances, including one or more phospholipids, are adsorbed onto the sorbent. Contact time and/or flow rate may be optimized for proper diffusion kinetics and binding of the one or more target analytes and the one or more phospholipids to the sorbent. If desired the sample fluid may be passed multiple times through the device.

In certain embodiments, for example, where the sorbent is not readily water-wettable, conditioning and equilibrating steps may be performed prior to sample loading. For example, in an exemplary embodiment, the conditioning may be performed with methanol, ethanol, propanol, isopropyl alcohol, water and a mixture thereof, among other possibilities. For example, in an exemplary embodiment, the equilibrating solution may have similar or same ionic strength as the sample fluid to provide equilibrated partitioning environments in the sorbents when the sample fluid is loaded. Exemplary equilibrating solution/solvent include, for example, water, an aqueous solution such as a buffer solution (e.g., a phosphate buffer solution), a water-miscible organic solvent solution and the like. In certain embodiments, for example, where the sorbent is sufficiently water-wettable, conditioning and equilibrating may be omitted before sample loading.

In various embodiments, the elution solutions used in accordance with the present disclosure may comprise (a) from 60 vol % to 100 vol % polar aprotic solvent, for example, ranging from 60 vol % to 65 vol % to 70 vol % to 75 vol % to 80 vol % to 85 vol % to 90 vol % to 95 vol % to 98 vol % to 100 vol % polar aprotic solvent and (b) from 0 vol % to 40 vol % protic solvent, for example ranging from 0 vol % to 2 vol % to 5 vol % to 10 vol % to 15 vol % to 20 vol % to 25 vol % to 30 vol % to 35 vol % to 40 vol % protic solvent. In certain embodiments, the elution solution may comprise 65-95 vol % of the polar aprotic solvent and 5-35 vol % of the protic solvent, more typically, 70-90 vol % of the polar aprotic solvent and 10-30 vol % of the protic solvent Particular examples of protic solvents for use in conjunction with the present disclosure include, for example, methanol, ethanol, 1-propanol, 2-propanol, t-butanol, acetic acid, formic acid, aqueous ammonia, methanolic ammonia, water, and blends thereof.

Particular examples of polar aprotic solvents for use in conjunction with the present disclosure include, for example, acetonitrile, acetone, tetrahydrofuran, methylene chloride, ethyl acetate, N,N-dimethylformamide, dimethyl sulfoxide, dimethyl ether, and blends thereof.

The particular methods employed herein may vary based on the nature of the sorbent, specifically, whether the sorbent is an ion exchange sorbent (e.g., a strong cation exchange sorbent, a strong anion exchange sorbent, a weak cation exchange sorbent, or a weak anion exchange sorbent), or whether the sorbent is not an ion exchange sorbent.

Methods Based on Sorbents without Ion Exchange Functionality

In certain embodiments, sorbents may be employed which do not have ion exchange functionality.

In these embodiments, an elution solution like that described above may be employed. For example, the elution solution may comprise 65-95 vol % of the polar aprotic solvent and 5-35 vol % of the protic solvent, more typically 70-90 vol % of the polar aprotic solvent and 10-30 vol % of the protic solvent.

In these embodiments, the sample fluid may be prepared by combining a sample with a pretreatment solution that comprises a pretreatment compound and water. In these embodiments, the sample may be combined with the pretreatment solution in a ratio ranging from 2:3 to 2:1 vol/vol, among other possibilities.

In some embodiments, the pretreatment compound may be an acidic compound, which may be selected from a wide variety of acidic compounds, including one or more of the following: organic acids such as formic acid, acetic acid, propionic acid, butyric acid, oxalic acid, malonic acid, succinic acid and maleic acid, among others and including organic hydroxyacids such as glycolic acid, lactic acid, tartaric acid, malic acid, citric acid and gluconic acid, among others; and inorganic acids such as phosphoric acid, hydrochloric acid, nitric acid, sulfuric acid, or carbonic acid, among others. In certain beneficial embodiments, the acidic compound is selected from phosphoric acid, formic acid, acetic acid, sulfuric acid and blends thereof.

In particular embodiments, the pretreatment solution may comprise $H_3PO_4$ and water. For example, the pretreatment solution may contain 3-5 wt % concentrated $H_3PO_4$ in water.

In some embodiments, the pretreatment solution may further comprise an organic solvent in addition to the pretreatment compound and water. Where included, the organic solvent is typically a protic organic solvent, which may be selected from those listed above, among others. In these embodiments, the sample may be combined with the pretreatment solution in a ratio ranging from 1:3 to 1:5 vol/vol, among other possibilities.

In particular embodiments, the pretreatment solution may comprise $H_3PO_4$, water and methanol. For example, the pretreatment solution may contain 3-5 wt % concentrated $H_3PO_4$ in water combined with methanol, which are provided in a ratio ranging from 92:8 to 97:3 vol/vol.

In various embodiments, the method may further comprise adding a washing solution to the sorbent after adding the sample fluid and before adding the elution solution. The washing solution may comprise, for example, water and an organic solvent, typically a protic organic solvent such as methanol, among others. The water and protic organic solvent may be combined in a ratio ranging from 90:10 to 98:2 vol/vol, among other possibilities.

Specific embodiments of the present disclosure where sorbents are used that do not have ion exchange functionality are provided below in Table. 1.

TABLE 1

| 2-Step Protocol | 3-Step Protocol |
| --- | --- |
| Step 1 - Load | Step 1 - Load |
| Pre-treated sample | Pre-treated sample |
| (e.g. dilute plasma | (e.g. dilute plasma |
| 1:4 with 4% | 1:1 with 4% |
| $H_3PO_4$ in 94/6 | $H_3PO_4$(aq)) |
| water/methanol) | |
| | Step 2 - Wash |
| | 95/5 Water/Methanol |
| Step 2 - Elute | Step 3 - Elute |
| 90/10 | 90/10 |
| Acetonitrile/Methanol | Acetonitrile/Methanol |

Methods Based on Strong Cation Exchange and Weak Anion Exchange Sorbents

In certain embodiments, a sorbent may be employed which is a strong cation exchange sorbent. Such sorbents may be employed, for example, where the target analyte is a basic target analyte (e.g., having a pKa of 2-10). In such embodiments, the target analyte is generally ionized by the pre-treatment solution.

Examples of strong cation exchange sorbent include those wherein the organic copolymer component comprises an organic monomer that comprises one or more sulfonate groups. For example, the organic copolymer component may comprise a divinylbenzene monomer that comprises one or more sulfonate groups, among other possibilities.

In certain embodiments, a sorbent may be employed which is a weak anion exchange sorbent which can be protonated in the pH range of 4 to 10.

Examples of weak anion exchange sorbents include those wherein the organic copolymer component comprises an organic monomer that comprises one or more primary, secondary or tertiary amine groups. For example, the organic copolymer component may comprise a divinylbenzene monomer that comprises one or more piperazine groups, among other possibilities.

Where the sorbent is a strong cation exchange sorbent or a weak anion exchange sorbent, an elution solution like that described above, along with a basic compound may be employed. In certain embodiments, the elution solution may comprise 65-95 vol % of the polar aprotic solvent, 5-35 vol % of the protic solvent and the basic compound (which is typically provided an amount that is less than or equal to the saturation capacity of the sorbent), more specifically, 70-90 vol % of the polar aprotic solvent, 10-30 vol % of the protic solvent, and the basic compound.

Examples of basic compounds may be selected from one or more of the following, among others: ammonium hydroxide ($NH_4OH$), alkali metal hydroxides (e.g., NaOH, KOH, LiOH, RbOH, etc.), alkaline earth metal hydroxides (e.g., $Mg(OH)_2$, $Ca(OH)_2$, $Sr(OH)_2$, etc.), ammonium bicarbonate, organic bases, and combinations thereof. In some beneficial embodiments, the basic compound may be selected from ammonium hydroxide ($NH_4OH$), NaOH, KOH, ammonium bicarbonate and combinations thereof.

In certain embodiments, the elution solution may comprise acetonitrile as a polar aprotic solvent, methanol as a protic solvent and $NH_4OH$ as a base, for example, containing 3-8 wt % concentrated $NH_4OH$.

Where the sorbent is a strong cation exchange sorbent or a weak anion exchange sorbent, the sample fluid may comprise a sample of interest combined with a pretreatment solution.

In some embodiments, the sample of interest is combined with a pretreatment solution that contains an organic solvent and one or more pretreatment compounds. In certain beneficial embodiments, the organic solvent is methanol.

Typically, the one or more pretreatment compounds include one or more acidic pretreatment compounds. Suitable acidic compounds may be selected from those listed above. In certain beneficial embodiments, the acidic pretreatment component may be selected from formic acid, carbonic acid, acetic acid, $H_3PO_4$, sulfuric acid, or a blend thereof.

In certain of these embodiments, the sample may be combined with the pretreatment solution in a ratio ranging from 2:3 to 2:1 vol/vol, among other possibilities.

In certain embodiments, the pretreatment solution may comprise methanol, formic acid and $H_3PO_4$, for example, 1-4 wt % concentrated $H_3PO_4$ and 1-4 wt % formic acid, in methanol.

In some embodiments, the sample of interest is combined with a pretreatment solution that contains water and one or more pretreatment compounds.

The one or more pretreatment compounds may be acidic compounds which may be selected from one or more acidic compounds such as those set forth above, among others. As a specific example, the pretreatment solution may contain 2-8 wt % concentrated $H_3PO_4$ in water.

In some embodiments where the sample fluid contains a sample of interest combined with a pretreatment solution that contains water and one or more pretreatment compounds, the method may further comprise adding a washing solution to the sorbent after adding the sample fluid and before adding the elution solution. In these embodiments, the washing solution may comprise an acidic compound and an organic solvent, typically a protic organic solvent. The acidic compound and the protic organic solvent may be selected from those listed above. In certain embodiments, the acidic compound is selected from formic acid, carbonic acid, and acetic acid and the protic solvent may be methanol. In certain embodiments, the washing solution may comprise formic acid and methanol, for example, 1-4 wt % formic acid in methanol.

In other embodiments where the sample fluid contains a sample of interest combined with a pretreatment solution that contains water and one or more pretreatment compounds, the method may further comprise (a) adding a first washing solution to the sorbent after adding the sample fluid and before adding the elution solution, the first washing solution comprising an acidic compound and water and (b) adding a second washing solution to the sorbent after adding the first washing fluid and before adding the elution solution, the second washing solution comprising an organic solvent, typically a protic organic solvent. The acidic compound for the first washing solution may be selected from those listed above. In certain embodiment, the acidic compound is formic acid and the organic solvent is methanol. For example, the first washing solution may contain 1-4 wt % formic acid in water and the second washing solution be methanol.

Specific embodiments of the present disclosure where a strong cation exchange sorbent or a weak anion exchange sorbent is employed as a sorbent are provided below in Table 2.

In certain embodiments, a sorbent may be employed which is a weak cation exchange sorbent, which can be deprotonated in the pH range of 1-7.

Examples of weak cation exchange sorbents include those wherein the organic copolymer component further comprises an organic monomer that comprises one or more carboxyl groups, for example, a divinylbenzene monomer that comprises one or more carboxyl groups.

Where the sorbent is a strong anion exchange sorbent or a weak cation exchange sorbent, an elution solution like that described above, along with an acidic compound may be employed. In certain embodiments, the elution solution may comprise 65-95 vol % of the polar aprotic solvent, 5-35 vol % of the protic solvent and the acidic compound (e.g., in an amount up to the sorbent capacity), typically 65-85 vol % of the polar aprotic solvent, and 15-35 vol % of the protic solvent, and the acidic compound.

Examples of acidic compounds may be selected from one or more of those listed above, among others. In certain embodiments, the acidic compound may be an organic acid, for example, selected from formic acid, acetic acid, carbonic acid, and blends thereof.

In particular embodiments, the elution solution may comprise acetonitrile as a polar aprotic solvent, methanol as a protic solvent, and formic acid as an acidic compound, for example, containing 1-4 wt % formic acid.

Where the sorbent is a strong anion exchange sorbent or a weak cation exchange sorbent, the sample fluid may comprise a sample of interest combined with a pretreatment solution.

TABLE 2

| 2-Step Protocol | 3-Step Protocol | 4-Step Protocol |
| --- | --- | --- |
| Step 1 - Load Pre-treated sample (e.g. dilute plasma 1:4 with 2% $H_3PO_4$ and 2% Formic Acid in Methanol) | Step 1 - Load Pre-treated sample (e.g. dilute plasma 1:1 with 4% $H_3PO_4$(aq)) | Step 1 - Load Pre-treated sample (e.g. dilute plasma 1:1 with 4% $H_3PO_4$(aq)) |
|  | Step 2 - Wash 2% Formic Acid in Methanol | Step 2 - Wash 1 2% Formic Acid in water Step 3 - Wash 2 100% Methanol |
| Step 2 - Elute 5% $NH_4OH$ in 75/25 (v/v) Acetonitrile/Methanol | Step 3 - Elute 5% $NH_4OH$ in 75/25 (v/v) Acetonitrile/Methanol | Step 4 - Elute 5% $NH_4OH$ in 75/25 (v/v) Acetonitrile/Methanol |

Methods Based on Strong Anion Exchange and Weak Cation Exchange Sorbents

In certain embodiments, a sorbent may be employed which is a strong anion exchange sorbent. Such sorbents may be employed, for example, where the target analyte is an acidic target analyte (e.g., having a pKa of 2-8)

Examples of strong anion exchange sorbent include those wherein the organic copolymer component comprises an organic monomer that comprises one or more quaternary ammonium groups. For example, the organic copolymer component may comprise an organic monomer that comprises one or more —$R_1N^+R_2R_3R_4$ groups, where $R_1$ is an alkylene group, typically, a C1-C8 alkylene group, and $R_2$, $R_3$ and $R_4$ may be the same or different and are alkyl groups, typically, C1-C8 alkyl groups. More particularly, the organic copolymer component may further comprise a divinylbenzene monomer that is substituted with one or more —$R_1$—$N^+R_2R_3R_4$ groups.

In some embodiments, the sample of interest is combined with a pretreatment solution that contains an organic solvent at high concentration and one or more pretreatment compounds.

Typically, the organic solvent is a protic organic solvent, which may be selected from those set forth above, among others. In certain beneficial embodiments, the organic solvent is methanol.

Typically, the one or more pretreatment compounds include one or more basic pretreatment compounds. Suitable basic pretreatment compounds may be selected from a variety of basic compounds, including one or more of those basic compounds listed above. In certain beneficial embodiments, the pretreatment compound is selected from $NH_4OH$, ammonium bicarbonate, pyridine, piperazine, and combinations thereof.

In certain of these embodiments, the sample may be combined with the pretreatment solution in a ratio ranging from 1:2 to 1:8 vol/vol, among other possibilities In certain embodiments, the pretreatment solution may comprise methanol and $NH_4OH$, for example, 3-8 wt % concentrated $NH_4OH$ in methanol.

In some embodiments, the sample of interest is combined with a pretreatment solution that contains water and one or more pretreatment compounds.

piperazine, and combinations thereof. In certain embodiments, the basic compound is $NH_4OH$ and the organic solvent is methanol. For example, the first washing solution may contain 3-8 wt % conc. $NH_4OH$ in water and the second washing solution may be methanol.

Specific embodiments of the present disclosure where a strong anion exchange sorbent or a weak cation exchange sorbent is employed as a sorbent are provided below in Table 3.

TABLE 3

| 2-Step Protocol | 3-Step Protocol | 4-Step Protocol |
| --- | --- | --- |
| Step 1 - Load<br>Pre-treated sample (e.g. dilute plasma 1:4 with 5% $NH_4OH$ in methanol) | Step 1 - Load<br>Pre-treated sample (e.g. dilute plasma 1:1 with 5% $NH_4OH$(aq))<br>Step 2 - Wash<br>5% $NH_4OH$ in Methanol | Step 1 - Load<br>Pre-treated sample (e.g. dilute plasma 1:1 with 5% $NH_4OH$(aq))<br>Step 2 - Wash 1<br>5% $NH_4OH$ (aq)<br>Step 3 - Wash 2<br>100% Methanol |
| Step 2 - Elute<br>2% Formic Acid in 75/25 (v/v) Acetonitrile/Methanol | Step 3 - Elute<br>2% Formic Acid in 75/25 (v/v) Acetonitrile/Methanol | Step 4 - Elute<br>2% Formic Acid in 75/25 (v/v) Acetonitrile/Methanol |

The one or more pretreatment compounds may be basic compounds which may be selected from one or more basic compounds such as those set forth above, among others, including $NH_4OH$, ammonium bicarbonate, pyridine, piperazine, and combinations thereof.

In certain of these embodiments, the sample may be combined with the pretreatment solution in a ratio ranging from 2:3 to 2:1 vol/vol, among other possibilities.

As a specific example, the pretreatment solution may contain 3-8 wt % concentrated $NH_4OH$ in water.

In some embodiments where the sample fluid contains a sample of interest combined with a pretreatment solution that contains water and one or more pretreatment compounds, the method may further comprise adding a washing solution to the sorbent after adding the sample fluid and before adding the elution solution. In these embodiments, the washing solution may comprise a basic compound and an organic solvent, typically a protic organic solvent, at high concentration. The basic compound and the protic organic solvent may be selected from those listed above. In certain embodiments, the basic compound may be selected from ammonium hydroxide ($NH_4OH$), NaOH, KOH, and combinations thereof, and the protic solvent may be methanol. In certain embodiments, the washing solution may comprise $NH_4OH$ and methanol, for example, 3-8 wt % conc. $NH_4OH$ in methanol.

In other embodiments where the sample fluid contains a sample of interest combined with a pretreatment solution that contains water and one or more pretreatment compounds, the method may further comprise (a) adding a first washing solution to the sorbent after adding the sample fluid and before adding the elution solution, the first washing solution comprising a basic compound and water and (b) adding a second washing solution to the sorbent after adding the first washing fluid and before adding the elution solution, the second washing solution comprising an organic solvent, typically a protic organic solvent at high concentration. The basic compound for the first washing solution may be selected from those listed above. In certain embodiment, the basic compound is selected from ammonium hydroxide ($NH_4OH$), NaOH, KOH, ammonium bicarbonate, pyridine, Additional Processing After being eluted from the sorbent, further processing of the one or more target analytes may include, for example, identifying, quantifying, or otherwise processing the one or more target analytes.

In various embodiments, methods described herein may further comprise analyzing samples using analytical instruments and/or techniques, for example, liquid chromatography (LC), including high performance liquid chromatography (HPLC) and ultra-high performance liquid chromatography (UHPLC), mass spectrometry (MS), including electrospray ionization mass spectrometry (ESI-MS), matrix-assisted laser desorption/ionization mass spectrometry (MALDI-MS), time-of-flight mass spectrometry (TOFMS), nuclear magnetic resonance, infrared analysis, ultraviolet analysis, or a combination thereof. For instance, in some embodiments, the processed samples may be analyzed using liquid chromatography, such as HPLC or UHPLC, in combination with mass spectrometry, such as MALDI-MS or ESI-MS, examples of which include liquid chromatography-mass spectrometry (LC-MS) techniques and liquid chromatography-mass spectrometry/mass spectrometry (LC-MS/MS) techniques. In certain embodiments, the methods described herein are useful for direct to MS detection, including direct analysis in real time (DART) mass spectrometry and atmospheric solids analysis probe (ASAP) mass spectrometry. In certain cases, analytical samples may be evaporated to dryness, and then reconstituted in another solution before being injected into a liquid chromatography system.

Kits

Kits may also be provided which comprises a sorbent as described elsewhere herein and one or more kit components selected from the following: (a) an elution solution that comprises a protic solvent and a polar aprotic solvent, for example, selected from those elution solutions described hereinabove, (b) a pretreatment solution, for example, selected from those pretreatment solutions described hereinabove, (c) one or more washing solutions, for example, selected from those washing solutions described hereinabove, (d) a collection plate or barrel, (e) a cap mat, (f)

calibration and reference standards, and (g) Identification tagging for each component, which may include passive tags, such as RFID tags, for tracking the components. In certain embodiments, the sorbent may be provided in multi-well strip, a multi-well plate, a column, or a single-use cartridge as described above.

Example 1

Oasis MCX™ particles (Commercially available from Waters Corporation, Milford, Mass., USA) were fully dispersed in toluene (18 mL/g) then azeotropically stripped (111° C., 1 h) to remove residual water from the material. These initial anhydrous conditions were important as they ensured water content accuracy when water was added in the subsequent step. The reaction was cooled to 40° C. and held at that temperature while a partially condensed polyethoxyoligosiloxane polymer (PEOS) consisting of 1:2:8 n-octadecyltrimethoxysilane/1,2-bis(triethoxylsilyl)ethane (BTEE)/Tetraethyl orthosilicate (TEOS) was added (4.11 g PEOS/g particles) was added and allowed to stir for 10 minutes followed by water in the form of an acid or base catalyst, in this case $NH_4OH_{(aq)}$ (0.125 g base/g particles). The reaction was stirred for an additional 10 minutes at 40° C. before the temperature was increased to 60° C. for 2 h. The reaction was then cooled to RT and the particles were isolated via filtration. The particles were subsequently washed twice with ethanol (10 ml/g) then redispersed in 70/30 (v/v) water/ethanol (10 mL/g). Ammonium Hydroxide (1 g $NH_4OH$/g particles) was then added and the mixture was stirred at 50° C. for 2 h. The reaction was then cooled <40° C. and the particles were isolated via filtration. The isolated particles were washed (10 ml/g) using the following sequence: 2×methanol/water (1:1 v/v), 2×methanol. Finally, the isolated, surface modified particles were dried for 16 h at 80° C. under 25 mm vacuum.

Example 1A

To ensure uniformity of the hybrid layer, the modified particles from Example 1 were exposed to elevated temperatures (100-140° C.) and pH (8-9.8) following the hydrothermal treatment process described in U.S. Pat. Nos. 6,686,035, 7,223,473 and 7,919,177, and in PCT application number WO 2008/103423.

Example 1B

Oasis MCX™ particles (Commercially available—Waters Corporation, Milford, Mass., USA) are surface modified using the process described in below.

Oasis MCX™ particles are fully dispersed in toluene (18 mL/g). An azeotropic strip (111° C., 1 h) is then performed to remove residual water from the material. These initial anhydrous conditions are important as they ensure water content accuracy when water is added in the subsequent step. The reaction temperature is held at 40° C. while 1:2:8 n-octadecyltrimethoxysilane/1,2-bis(triethoxylsilyl)ethane (BTEE)/Tetraethyl orthosilicate (TEOS) partially condensed polyethoxyoligosiloxane polymer (PEOS) (4.11 g PEOS/g particles) (0.80-5.0 g PEOS/g cores) is added and allowed to stir for 10 minutes followed by water in the form of a catalyst (0.03-0.3 g acid or base/g cores). The reaction is stirred for an additional 10 minutes at 40° C. before the temperature is increased to 60° C. for 2 h. The reaction is then cooled to RT and the particles are isolated via filtration. The particles are subsequently washed twice with ethanol (10 ml/g) then redispersed in 70/30 (v/v) water/ethanol (10 mL/g). Ammonium Hydroxide (1 g $NH_4OH$/g cores) is added and the mixture is stirred at 50° C. for 2 h. The reaction is then cooled <40° C. and the particles are isolated via filtration. The isolated particles are washed (10 ml/g) using the following sequence: 2×methanol/water (1:1 v/v), 2×methanol. Finally, the isolated, surface modified particles are dried for 16 h at 80° C. under 25 mm vacuum. The above process is repeated 1-60 times.

Example 1C

To ensure uniformity of the hybrid layer, the modified particles from Example 1B are exposed to elevated temperatures (100-140° C.) and pH (8-9.8) following the hydrothermal treatment process as noted in U.S. Pat. Nos. 6,686,035, 7,223,473 and 7,919,177, and in PCT application number WO 2008/103423. The process of attaching 100% BTEE PEOS core-coating material, as described above, is repeated 0-60 additional times with or without subsequent exposure to elevated temperatures (100-140° C.) and pH (8-9.8) following the hydrothermal treatment process as noted by Jiang {U.S. Pat. Nos. 6,686,035; 7,223,473; 7,919,177} and Wyndham {WO 2008/103423}.

Example 1D

The process as described in Example 1B is further expanded to include monomer and polymer inorganic and/or organic materials in place of 1:2:8 n-octadecyltrimethoxysilane/1,2-bis(triethoxylsilyl)ethane (BTEE)/Tetraethyl orthosilicate (TEOS) PEOS.

Example 1E

As an alternative approach to producing the described product, cross-linking hybrid monomer such as but not limited to, methacryloxypropyltrimethoxysilane (MAPTMOS), Vinyltriethoxysilane (VTES), or others as listed in U.S. Pat. No. 8,791,220 may be incorporated onto the Oasis MCX™ particle surface, followed by the addition of a hydrophobic alkyl phase via toluene reflux using a base catalyst.

Example 2

Inorganic/organic hybrid particles used are produced as described in U.S. Pat. Nos. 8,791,220 and 9,211,524.

A solution of poly(vinyl alcohol) (PVA; 87%-89% hydrolyzed; Ave $M_w$ 13,000-23,000) in water was prepared by mixing and heating to 80° C. for 0.5 hours. Upon cooling, the PVA solution was combined with a solution comprising of divinylbenzene (DVB; 80%), 2,2'-azobisisobutyronitrile (AIBN), N-vinyl 2 pyrrolidione (N-VP) and/or N-vinylcaprolactam (V-CAP), methacryloxypropyltrimethoxysilane (MAPTMOS) and/or p-styryltrimethoxysilane (Styryl TMOS), and one or more of the following coporogens: 2-ethylhexanoic acid (2-EHA), toluene (HPLC grade), cyclohexanol (CXL), 1-methyl-2-pyrrolidinone (NMP). The resulting solution was mixed using a mechanical stirrer with Teflon paddle under a nitrogen flow or by continuous static mixing for approximately 20 minutes or until the desired particle size, monitored periodically via microscopy and/or laser diffraction (Mastersizer 2000 Malvern Instruments, Westborough, Mass.), was obtained. The emulsification was then heated to 70-80° C. for 20 hours while stirring (mechanical stirring with Teflon paddle). Upon cooling to 50°

C., the suspension of formed particles was quenched with water and the particles were filtered and then washed consecutively with copious amounts of hot water (80° C.), RT water, and then methanol. The particles were then dried at 80° C. at a reduced pressure for 16 hours. Specific reagent amounts and reaction conditions are listed in FIG. 5. The specific surface areas (SSA), specific pore volumes (SPV) and the average pore diameters (APD) of these materials were measured using the multi-point $N_2$ sorption method and are listed in FIG. 5 (Micromeritics ASAP 2420; Micromeritics Instruments Inc., Norcross, Ga., or equivalent). The specific surface area was calculated using the BET method, the specific pore volume was the single point value determined for $P/P_0>0.98$, and the average pore diameter was calculated from the desorption leg of the isotherm using the BJH method.

Example 2a

The particles of hybrid silica prepared according to Example 2 were sulfonated using the following process.

Hybrid particles were combined with concentrated sulfuric acid (10 mL/g particles) and stirred at room temperature in a 1 L round-bottom flask. After stirring for 1 hour, the solution was slowly added to a stirred solution of water (>100 mL/g particles), and the mixture was stirred for 10 minutes. The modified hybrid silica particles were either filtered or sedimented overnight to remove residual small particles then filtered. The isolated particles were washed successively with water, methanol (J. T. Baker), and then dried at 80° C. under reduced pressure for 16 hours. Analytical data can be found in FIG. 6.

Example 2b

The particles of hybrid silica prepared from Example 2a were surface modified with mC18 silane using the following process.

Hybrid particles were fully dispersed in toluene (5-10 mL/g particles) then azeotropically stripped (111° C., 1 h) to remove residual water from the material. Upon cooling <40° C., 1.5 micromoles of silane per square meter of particle surface area and 1 equivalent (per mole silane) of imidazole were added to the particle/toluene mixture. The resultant mixture was refluxed for 4 hours. Once the reaction was cooled <40° C., water (5 mL/g particles) was added to the flask and the mixture was allowed to stir for 5 minutes. The modified hybrid silica particles were filtered and washed successively with toluene, acetone, 1:1 v/v acetone/water, and acetone (5 mL/g particle), and then dried at 80° C. under reduced pressure for 16 hours. Analytical data can be found in Table 4. The loading of sulfonic acid groups was determined by titration with 0.1 N NaOH (Metrohm 905 Titrando autotitrator with 6.0280.300 pH electrode; Metrohm, Hersau, Switzerland, or equivalent).

TABLE 4

| mC18 Bonding ID | Precursor Sample ID | Capacity (meq/g) |
|---|---|---|
| 3a | 2a | 0.82 |
| 3b | 2b | 0.82 |
| 3c | 2c | 0.81 |
| 3e | 2e | 0.85 |
| 3f | 2f | 0.81 |
| 3g | 2g | 1.04 |
| 3h | 2h | 1.01 |
| 3i | 2i | 1.02 |

Example 3

A rat plasma (Equitech-Bio Inc., Kerrville Tex.) sample was spiked with 10 analytes, to the concentrations given in Table 5. Analytes were purchased from Analytes were purchased from Cerilliant® Analytical Reference Standards, Round Rock, Tex., USA, a SIGMA-ALDRICH® Company.

A 1 mL sample was prepared using 500 µL of rat blood plasma (Bioreclamation IVT Westbury, N.Y. 11590), 460 µL of 4% $H_3PO_4$, and spiked with 40 µL of a solution of 10 analytes with the concentrations listed in Table 5.

TABLE 5

| Compunds | Abbreviation | Conc. (ng/mL) |
|---|---|---|
| Tramadol | TRA | 100 |
| Tapentadol | TAP | 100 |
| Benzoylecgonine | BZE | 100 |
| 7-Aminoclonazepam | 7-AMI | 20 |
| Phencyclidine | PCP | 20 |
| Fentanyl | FEN | 100 |
| Flurazepam | FLU | 100 |
| Methadone | METH | 20 |
| A-Hydroxyalprazolam | AOHA | 20 |
| Diazepam | DIAZ | 100 |

The major class of phospholipids (PL) selected for monitoring are phosphatidylcholine (PC), making up approximately 70% of total human plasma phospholipids. See Ismaiel, O. A. et al., "Investigation of endogenous blood plasma phospholipids, cholesterol and glycerides that contribute to matrix effects in bioanalysis by liquid chromatography/mass spectrometry," *J. Chromatogr., B* 2010, 878, 3303-3316.

SPE protocols are shown in Table 6 below. The standard protocol (no conditioning or equilibration steps) for mixed mode solid phase extraction (SPE) using Oasis MCX™ is shown on the left-hand side of the table (MCX Protocol), whereas 4-step, 3-step and 2-step protocols in accordance with the present disclosure are shown of the right-hand side of the table.

TABLE 6

| MCX Protocol | 4-Step Protocol | 3-Step Protocol | 2-Step Protocol |
|---|---|---|---|
| Oasis MCX ™ SPE Protocol | SPE Matrix Removal Protocol | SPE Matrix Removal Simplified Protocol | SPE Matrix Removal Minimal Protocol |
| (bases with pKa 2-10) | (bases with pKa 2-10) | (bases with pKa 2-10) | (bases with pKa 2-10) |
| Step 1 - Load | Step 1 - Load | Step 1 - Load | Step 1 - Load |
| Pre-treated sample | Pre-treated sample | Pre-treated sample | Pre-treated sample |
| (e.g. dilute plasma 1:1 with 4% | (e.g. dilute plasma 1:1 with 4% | (e.g. dilute plasma 1:1 with 4% | (e.g. dilute plasma 1:4 with 2% |

TABLE 6-continued

| MCX Protocol | 4-Step Protocol | 3-Step Protocol | 2-Step Protocol |
|---|---|---|---|
| $H_3PO_4$(aq)) | $H_3PO_4$(aq)) | $H_3PO_4$(aq)) | $H_3PO_4$ and 2% Formic Acid in Methanol) |
| Step 2 - Wash 1 2% Formic Acid (aq) | Step 2 - Wash 1 2% Formic Acid (aq) | Step 2 - Wash 2% Formic Acid in Methanol | |
| Step 3 - Wash 2 100% Methanol | Step 3 - Wash 2 100% Methanol | | |
| Step 4 - Elute 5% $NH_4OH$ in Methanol | Step 4 - Elute 5% $NH_4OH$ in 75/25 (v/v) Acetonitrile/Methanol | Step 3 - Elute 5% $NH_4OH$ in 75/25 (v/v) Acetonitrile/Methanol | Step 2 - Elute 5% $NH_4OH$ in 75/25 (v/v) Acetonitrile/Methanol |

Typical loading volume is 25-750 μL (200 μL preferred) for Waters μElution plate (Waters Corporation, Milford, Mass., USA) (2 mg sorbent mass format). Typical washing volume is 200-400 μL. Typical elution volume is 25-100 μL (50 μL preferred). Typical dilution volume, if desired, is 50-150 μL. In general, volumes are scaled with sorbent mass or volume.

Solutions used for the protocols are as follows:

2% formic acid (aqueous) is a solution 98/2 (v/v) water/formic acid

2% formic acid in methanol is a solution 98/2 (v/v) methanol/formic acid

5% $NH_4OH$ in methanol is a solution 95/5 (v/v) methanol/$NH_4OH$ from concentrated $NH_4OH$ 5% $NH_4OH$ in 75/25 acetonitrile/methanol is a solution 71.25/23.75/5 (v/v/v) acetonitrile/methanol/$NH_4OH$ from concentrated $NH_4OH$ 4% $H_3PO_4$ (aq) is an aqueous solution of 96/4 (v/v) water/$H_3PO_4$ from concentrated $H_3PO_4$.

2% $H_3PO_4$ and 2% formic acid in methanol is a solution of 96/2/2 (v/v) methanol/$H_3PO_4$ from concentrated $H_3PO_4$/formic acid.

The protocol for analyte capture and matrix removal is as follows: samples are pre-treated using 4% $H_3PO_4$ (aq) in a 1:1 ratio or using 2% $H_3PO_4$ and 2% formic acid in methanol in a 1:4 ratio, and then loaded into a plate well or cartridge device. For MCX and 4-Step Protocols the first wash is an acidic aqueous solution and the second wash is a high % organic solution. For the 3-Step Protocol, the contents of the two washes of the 4-Step Protocol have been combined into an acidified organic/aqueous solution. The wells/cartridges are 'pulled dry' prior to the elution step. The final elute step is a basified high organic solution with a protic solvent and a polar aprotic solvent, typically with more than 60% acetonitrile, which is provided to remove phospholipids. The protic solvent content, typically around 10% to 30% methanol, is used to achieve acceptable analyte recovery.

Phospholipid and Analyte Analyses: 2 μL of the pre-treated sample was injected on an ACQUITY CSH C18 1.7 μm 2.1×100 mm UPLC column (Waters Corporation) and analyzed with a XEVO TQ-S Mass Spectrometer (Waters Corporation). UPLC mobile phases for lipids quantification and analyte recovery tests (gradient conditions) are shown in Tables 7 and 8, where mobile phase A is 0.1% formic acid in water and mobile phase B is 0.1% formic acid in acetonitrile.

TABLE 7

| Time (min) | Flow Rate (mL/min) | % A | % B | Curve |
|---|---|---|---|---|
| Initial | 0.5 | 90 | 10 | Initial |
| 1 | 0.5 | 90 | 10 | 6 |
| 4 | 0.5 | 30 | 70 | 6 |
| 4.1 | 0.5 | 5 | 95 | 6 |
| 7 | 0.5 | 5 | 95 | 6 |
| 7.5 | 0.5 | 90 | 10 | 6 |
| 8 | 0.5 | 90 | 10 | 6 |

TABLE 8

| Time (min) | Flow Rate (mL/min) | % A | % B | Curve |
|---|---|---|---|---|
| Initial | 0.6 | 95 | 5 | Initial |
| 5 | 0.6 | 10 | 90 | 6 |
| 5.1 | 0.6 | 95 | 5 | 6 |
| 6 | 0.6 | 95 | 5 | 6 |

Conditions for the Xevo TQ-S Mass Spectrometer are as follows:

Capillary voltage: 3.0 kV
Cone voltage: 50 V
Desolvation temperature: 500° C.
Desolvation gas flow: 100 L/hr
Cone gas flow: 150 L/hr
Nebulizer: 7.0 Bar
Collision gas flow: 0.25 ml/min The results are as follows. Using the MCX Protocol, the particle of Example 1 performs comparably for phospholipid removal to Oasis MCX™. However, using the 4-step Protocol, the Coated Oasis MCX™ particle achieved 64% additional phospholipid removal vs. Oasis MCX™. The 4-step Protocol used on the Coated Oasis MCX™ achieved an additional 81% phospholipid removal vs. Oasis MCX™ using the MCX Protocol. FIG. 1 shows total phospholipid content (TIC peak area) for Oasis MCX™ compared to the particle of Example 1. Both sorbents were tested with the MCX Protocol (left) and the 4-step Protocol (right) (90/10 acetonitrile/methanol used in the elution step).

Figure 2:
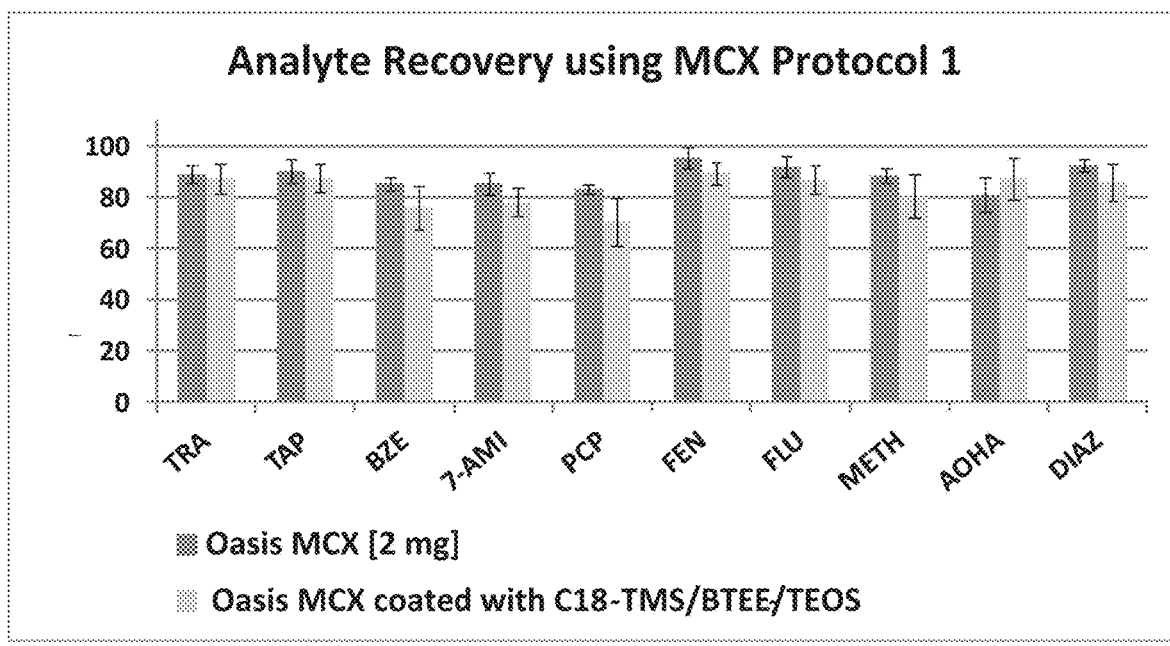
FIG. 2 shows percent analyte recovery in elute fraction for Oasis MCX™ sorbent particles compared to particles in accordance with the present disclosure, using a preexisting method protocol.

With regard to analyte recovery (pre- and post-spike of analyte standards) data shown in FIG. 2 for both materials tested (i.e., Oasis MCX™ and particle of Example 1) under the MCX Protocol demonstrates similar loading/ion exchange capacity for the materials.

Figure 3:
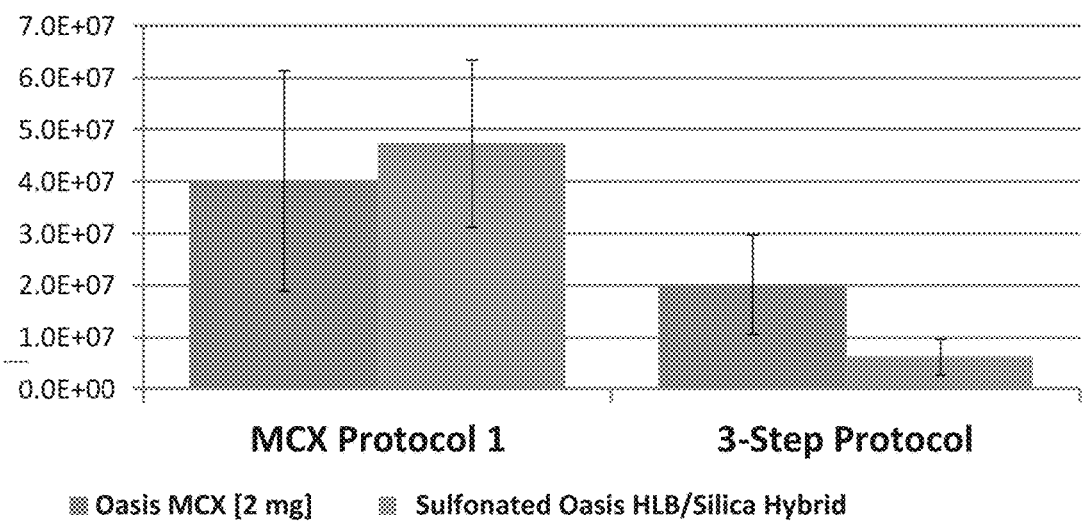
FIG. 3 shows total phospholipid content (TIC peak area) levels in elute fraction for Oasis MCX™ sorbent particles compared to particles in accordance with the present disclosure, using a preexisting method protocol and a method protocol in accordance with the present disclosure.

Using the Oasis MCX™ Protocol, particle of Example 2 performs comparably for phospholipid removal to Oasis MCX™. Using the 4-step Protocol (5% $NH_4OH$ in 90/10 ACN/MeOH final elution), however, the particle of Example 2 achieved 69% additional phospholipid removal vs. Oasis MCX™ using MCX Protocol. Moreover, as seen in FIG. 3, for the 3-Step Protocol, the particle of Example 2 achieved an additional 84% phospholipid removal vs. Oasis MCX™ using the MCX Protocol. In particular, FIG. 3 shows total phospholipid content (TIC peak area) for Oasis MCX™ compared to i particle of Example 2, with both sorbents being tested with the MCX Protocol (left) and the 3-step Protocol (right). The 3-Step Protocol is very effective with the particle of Example 2 for removing phospholipids from the final elute fraction.

Figure 4:
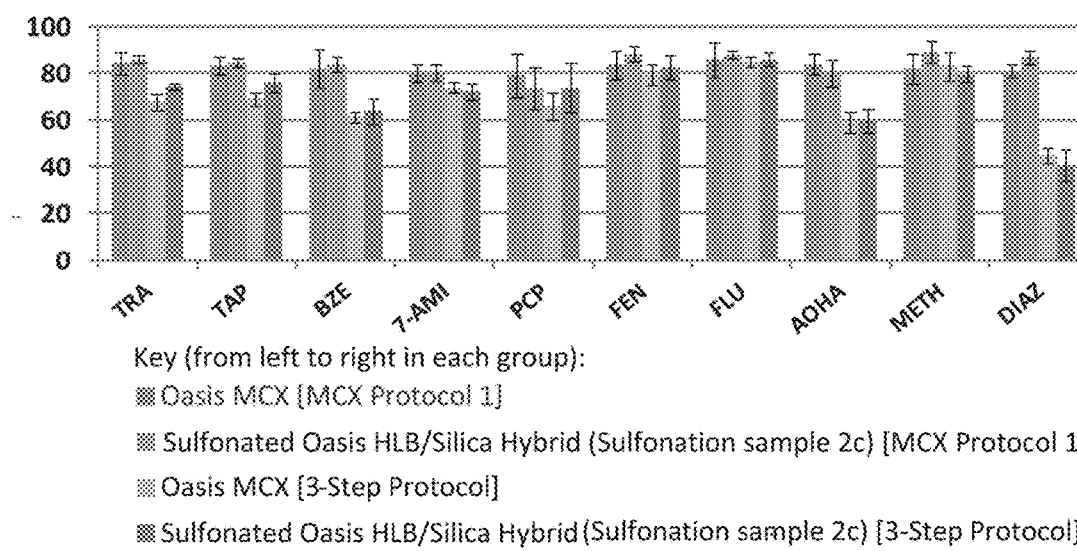
FIG. 4 shows percent analyte recovery in elute fraction for Oasis MCX™ sorbent particles compared to particles in accordance with the present disclosure, using a preexisting method protocol and a method protocol in accordance with the present disclosure.

Furthermore, as seen from FIG. 4, analyte recovery (pre- and post-spike of analyte standards) is comparable for the Oasis MCX™ and the particle of Example 2 under the MCX Protocol and the 3-Step Protocol, indicating that both materials perform similarly under each Protocol and ion exchange capacity for the particle of Example 2 is comparable to the Oasis MCX™ material.

The invention claimed is:

1. Inorganic/organic hybrid sorbent particles comprising (a) a core region that comprises a silica component and (b) a surface region that comprises an organic copolymer comprising at least one hydrophobic organic monomer and at least one hydrophilic organic monomer; wherein the core region consists of silica or wherein the core region is formed by hydrolytically condensing one or more silane compounds.

2. The inorganic/organic hybrid sorbent particles of claim 1, wherein the core region consists of silica.

3. The inorganic/organic hybrid sorbent particles of claim 1, further comprising a C4-C60 alkyl component.

4. The inorganic/organic hybrid sorbent particles of claim 1, wherein the core region is formed by hydrolytically condensing one or more silane compounds.

5. The inorganic/organic hybrid sorbent particles of claim 4, wherein the one or more silane compounds that are hydrolytically condensed comprise (a) one or more silane compounds of the formula $SiZ_1Z_2Z_3Z_4$, where $Z_1$, $Z_2$, $Z_3$ and $Z_4$ are independently selected from Cl, Br, I, C1-C4 alkoxy, C1-C4 alkylamino, and C1-C4 alkyl, although at most three of $Z_1$, $Z_2$, $Z_3$ and $Z_4$ can be C1-C4 alkyl and/or (b) one or more compounds of the formula $Si\ Z_1Z_2Z_3$—R—$SiZ_4Z_5Z_6$, where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl, and where $Z_4$, $Z_5$ and $Z_6$ are independently selected from Cl, Br, I, C1-C4 alkoxy, C1-C4 alkylamino, and C1-C4 alkyl, although at most two of $Z_4$, $Z_5$ and $Z_6$ can be C1-C4 alkyl.

6. The inorganic/organic hybrid sorbent particles of claim 4, wherein the one or more alkoxysilane compounds are selected from tetraalkoxysilanes, bis(trialkoxysilyl)alkanes, and alkyl-trialkoxysilane.

7. The inorganic/organic hybrid sorbent particles of claim 4, wherein the one or more silane compounds that are hydrolytically condensed further comprise a C4-C60-alkyl-functionalized organosilane compound.

8. The inorganic/organic hybrid sorbent particles of claim 1, wherein a previously formed core region is reacted with a C4-C60-alkyl-functionalized organosilane compound.

9. The inorganic/organic hybrid sorbent particles of claim 7, wherein the C4-C60-alkyl-functionalized organosilane compound is a compound of the formula $RSiZ_1Z_2Z_3$, where R is C4-C60 alkyl and where $Z_1$, $Z_2$ and $Z_3$ are independently selected from Cl, Br, I, C1-C4 alkoxy, C1-C4 alkylamino, and C1-C4 alkyl, although at most two of $Z_1$, $Z_2$ and $Z_3$ can be C1-C4 alkyl.

10. The inorganic/organic hybrid sorbent particles of claim 7, wherein the C4-C60-alkylorganosilane is selected from octadecyltrimethoxysilane, octadecyltriethoxysilane, octadecyltrichlorosilane, octadecyltri(dimethylamino)silane, methyloctadecyldimethoxysilane, methyloctadecyldiethoxysilane, methyloctadecyldichlorosilane, methyloctadecyldi(dimethylamino)silane, dimethyloctadecylmethoxysilane, dimethyloctadecylethoxysilane, dimethyloctadecylchlorosilane, dimethyloctadecyldimethylaminosilane, diisopropyloctadecylmethoxysilane, diisopropyloctadecylethoxysilane, diisopropylocta- decylchlorosilane, diisopropyloctadecyldimethylaminosilane, octyltrimethoxysilane, octyltriethoxysilane, octyltrichlorosilane, octyltri(dimethylamino)silane, methyloctyldimethoxysilane, methyloctyldiethoxysilane, methyloctyldichlorosilane, methyloctyldi(dimethylamino)silane, dimethyloctylmethoxysilane, dimethyloctylethoxysilane, dimethyloctylchlorosilane, dimethyloctyldimethylaminosilane, diisopropyloctylmethoxysilane, diisopropyloctylethoxysilane, diisopropyloctylchlorosilane, diisopropyloctyldimethylaminosilane, butyltrimethoxysilane, butyltriethoxysilane, butyltrichlorosilane, butyltri(dimethylamino)silane, methylbutyldimethoxysilane, methylbutyldiethoxysilane, methylbutyldichlorosilane, methylbutyldi(dimethylamino)silane, dimethylbutylmethoxysilane, dimethylbutylethoxysilane, dimethylbutylchlorosilane, dimethylbutyldimethylaminosilane, diisopropylbutylmethoxysilane, diisopropylbutylethoxysilane, diisopropylbutylchlorosilane, and diisopropylbutyldimethylaminosilane.

11. The inorganic/organic hybrid sorbent particles of claim 1, wherein the core region further comprises an alkenyl-functionalized organosilane species incorporated into the core.

12. The inorganic/organic hybrid sorbent particles of claim 1, wherein an alkenyl-functionalized organosilane monomer is attached at the surface of the core region.

13. The inorganic/organic hybrid sorbent particles of claim 4, wherein the silane compounds that are hydrolytically condensed further comprise an alkenyl-functionalized organosilane species.

14. The inorganic/organic hybrid sorbent particles of claim 11, wherein the alkenyl-functionalized organosilane monomer is selected from 3-(trimethoxysilyl)propyl methacrylate (MAPTMOS), and vinyltriethoxysilane (VTES).

15. The inorganic/organic hybrid sorbent particles of claim 1, wherein the surface region that comprises the organic copolymer is formed by a process that comprises an addition polymerization of the at least one hydrophobic organic monomer and the at least one hydrophilic organic monomer.

16. The inorganic/organic hybrid sorbent particles of claim 1, wherein the surface region that comprises the organic copolymer is formed by a process that comprises free radical polymerization of the at least one hydrophobic organic monomer and the at least one hydrophilic organic monomer.

17. The inorganic/organic hybrid sorbent particles of claim 16, wherein the free radical polymerization is selected from Reversible Addition-Fragmentation Chain Transfer Polymerization (RAFT) and Atom Transfer Radical Polymerization (ATRP).

18. The inorganic/organic hybrid sorbent particles of claim 1, wherein the surface region that comprises the organic copolymer is formed by a process that comprises forming the organic copolymer and grafting the organic copolymer onto a surface of the core region (i.e., "grafting to") or polymerizing the organic copolymer from initiator sites on the surface of the core region ("grafting from").

19. The inorganic/organic hybrid sorbent particles of claim 1, wherein the

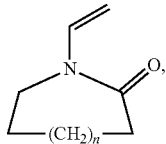

hydrophilic organic monomer comprises a monomer having the following formula, where n ranges from 1-3.

20. The inorganic/organic hybrid sorbent particles of claim 1, wherein the hydrophobic organic monomer comprises divinylbenzene and, optionally, styrene.

21. The inorganic/organic hybrid sorbent particles of claim 1, wherein the organic copolymer further comprises an organic monomer that comprises one or more sulfonate groups.

22. The inorganic/organic hybrid sorbent particles of claim 1, wherein the organic copolymer further comprises a divinylbenzene monomer that comprises one or more sulfonate groups.

23. The inorganic/organic hybrid sorbent particles of claim 1, wherein the organic copolymer further comprises an organic monomer that comprises one or more quaternary ammonium groups.

24. The inorganic/organic hybrid sorbent particles of claim 1, wherein the organic copolymer further comprises an organic monomer that comprises one or more— $R_1N±R_2R_3R_4$ groups, where $R_1$ is a C1-C8 alkylene group, and $R_2$, $R_3$ and $R_4$ are C1-C8 alkyl groups and may be the same or different.

25. The inorganic/organic hybrid sorbent particles of claim 1, wherein the organic copolymer further comprises a divinylbenzene monomer that comprises one or more— $R_1N±R_2R_3R_4$ groups, where $R_1$ is a C1-C8 alkylene group, and $R_2$, $R_3$ and $R_4$ are C1-C8 alkyl groups and may be the same or different.

26. The inorganic/organic hybrid sorbent particles of claim 1, wherein the core region comprises a material having the formula $SiO_2/(R^2{}_pR^4{}_qSiO_t)n$ or $SiO_2/[R^6(R^2{}_nSiO_t)_m]_n$ wherein $R^2$ and $R^4$ are independently $C_1$-$C_{18}$ aliphatic or aromatic moieties, $R^6$ is a substituted or unsubstituted $C_1$-$C_{18}$ alkylene, alkenylene, alkynylene or arylene moiety bridging two or more silicon atoms, p and q are 0, 1 or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2, and n is a number from 0.03 to 1.

27. The inorganic/organic hybrid sorbent particles of claim 1, wherein the organic copolymer further comprises an organic monomer that comprises one or more carboxyl groups.

28. The inorganic/organic hybrid sorbent particles of claim 1, wherein the organic copolymer further comprises a divinylbenzene monomer that comprises one or more carboxyl groups.

29. The inorganic/organic hybrid sorbent particles of claim 1, wherein the organic copolymer further comprises an organic monomer that comprises one or more primary, secondary or tertiary amine groups.

30. The inorganic/organic hybrid sorbent particles of claim 1, wherein the organic copolymer further comprises a divinylbenzene monomer that comprises one or more piperazine groups.

31. The inorganic/organic hybrid sorbent particles of claim 1, wherein the organic copolymer further comprises one or more C4-C60 alkyl groups.

32. The inorganic/organic hybrid sorbent particles of claim 1, wherein the organic copolymer further includes a C4-C60-alkyl functionalized unsaturated monomer.

33. The inorganic/organic hybrid sorbent particles of claim 1, wherein a C4-C-60-alkyl-group is attached to the organic copolymer.

34. Inorganic/organic hybrid sorbent particles comprising (a) a core region that comprises an organic copolymer comprising at least one hydrophobic organic monomer and at least one hydrophilic organic monomer and (b) a surface region that comprises a silica component, wherein the surface region is formed by hydrolytically condensing one or more silane compounds at the surface region of the core region.

* * * * *